Figures 1, 17:
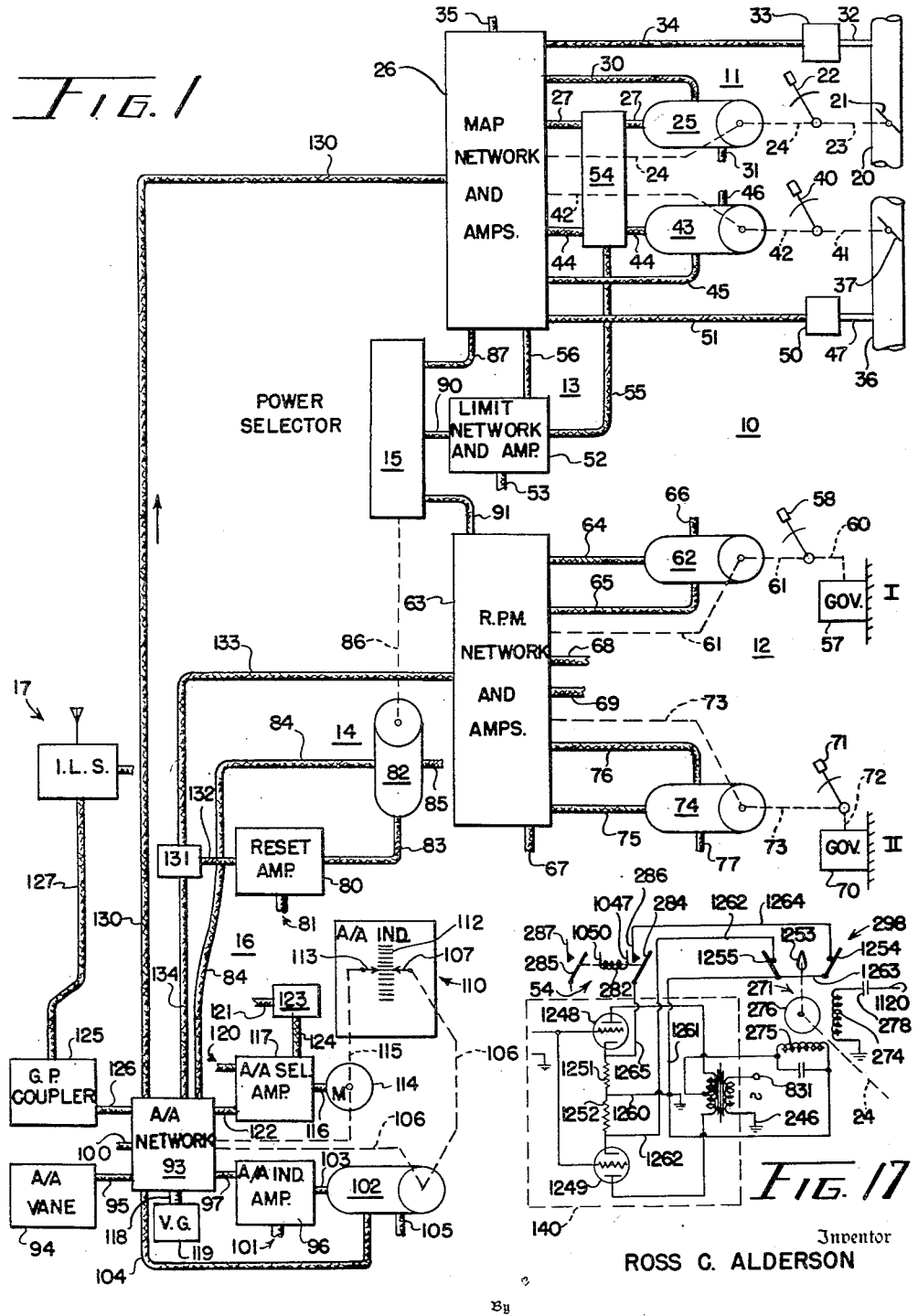

Inventor
ROSS C. ALDERSON
By George H Fisher
Attorney

Inventor
ROSS C. ALDERSON

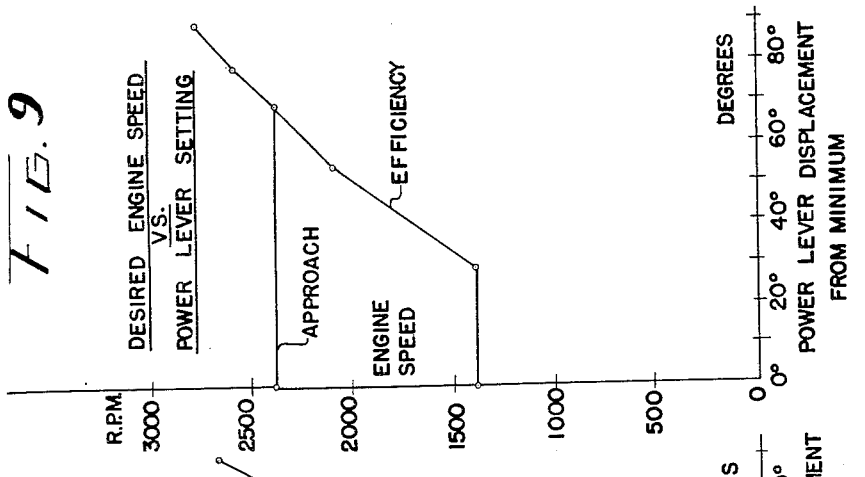
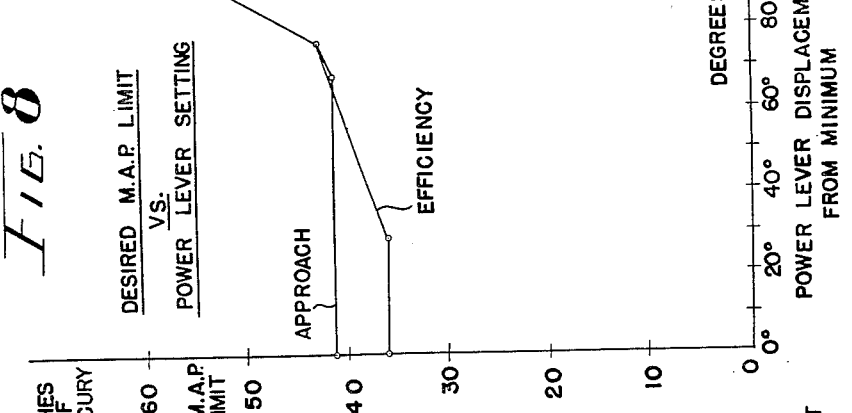
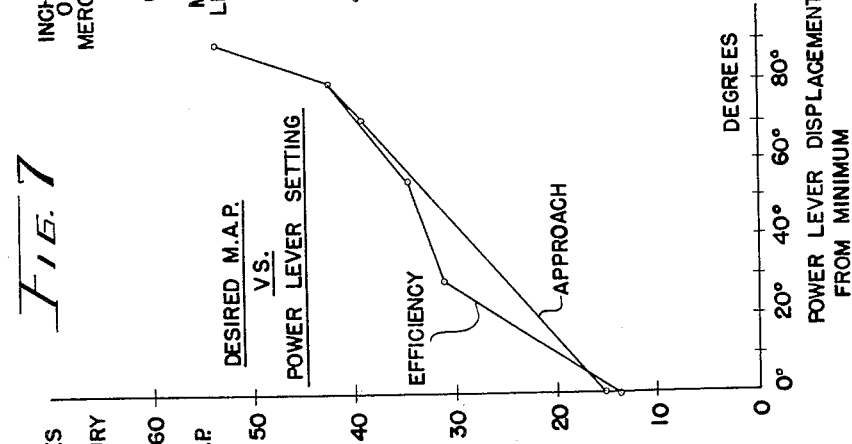

Dec. 18, 1956  R. C. ALDERSON  2,774,558
ATTACK ANGLE CONTROL APPARATUS FOR POWERED AIRCRAFT
Filed Jan. 18, 1951  8 Sheets-Sheet 8
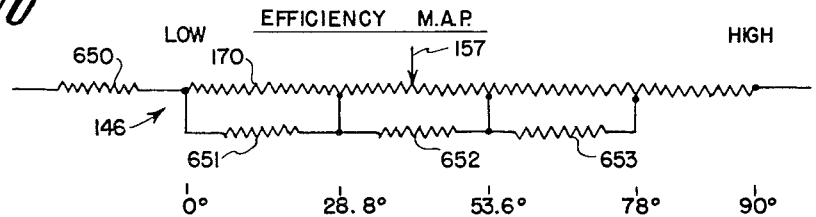
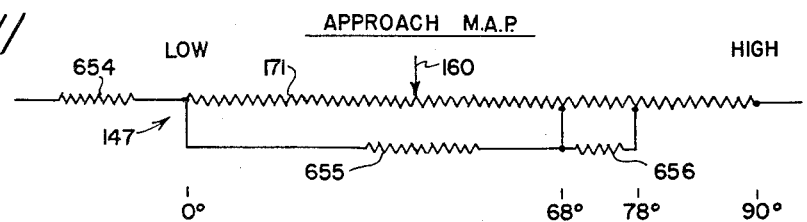
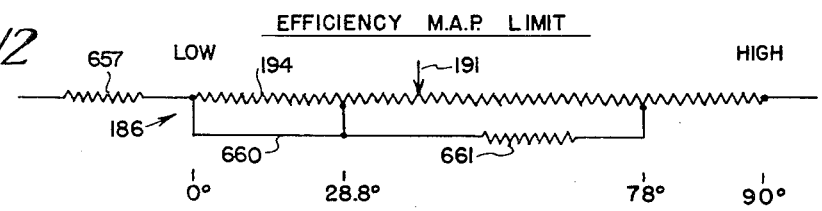
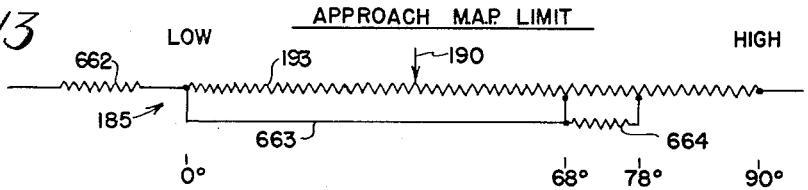
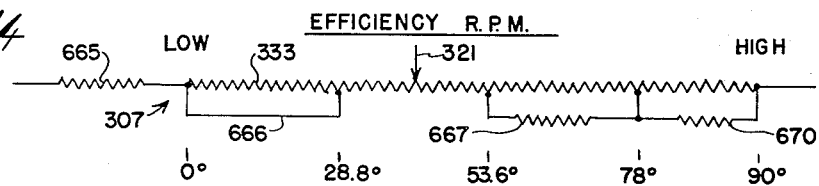
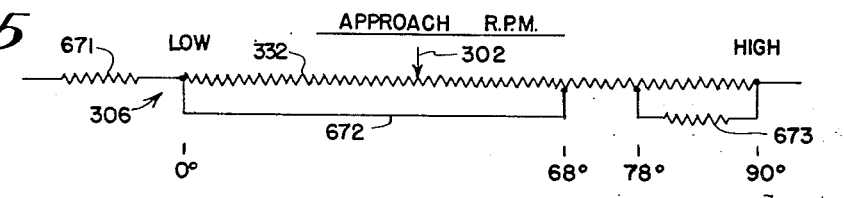
Inventor
ROSS C. ALDERSON
By
George H Fisher
Attorney United States Patent Office 2,774,558
Patented Dec. 18, 1956

2,774,558

ATTACK ANGLE CONTROL APPARATUS FOR POWERED AIRCRAFT

Ross C. Alderson, Minneapolis, Minn., assignor to Minneapolis-Honeywell Regulator Company, Minneapolis, Minn., a corporation of Delaware Application January 18, 1951, Serial No. 206,578

42 Claims. (Cl. 244—77)

This invention relates to the field of aircraft control, and more especially to equipment for automatically varying the effective power available for maintaining flight of a craft, so as to give the flight desired characteristics. While it is contemplated that the invention may be applied to drag flaps for example in aircraft having jet or rocket engines, the specific embodiment of the invention as illustrated is applied to the controls of conventional reciprocating engines.

It can be shown that when an aircraft having fixed airfoil characteristics is in sustained flight, certain relations exist between the power required to maintain the craft in flight, the pitch attitude of the craft, its attack angle, its air speed, and its rate of climb. The present invention assumes a constant pitch attitude and a predetermined rate of climb: accordingly for each value of attack angle of the craft there is a unique power requirement, and a unique air speed results.

In propeller driven craft a given power expenditure may result from a number of different combinations of throttle and propeller pitch control settings. The former adjusts the brake mean effective pressure (BMEP) of the engine, which may be measured by measuring the intake manifold pressure of the engine (MAP), and hence limits the power which the engine can supply. The latter varies the work done per revolution of the engine, and hence, for a given BMEP determines the speed (R. P. M.) of the engine. Hereafter the throttle will be referred to as means for adjusting the MAP of the engine, and the engine governor or propeller pitch control as means for adjusting the speed or R. P. M. of the engine.

Analysis of the operation of aircraft under various combinations of MAP and R. P. M. settings has made it apparent that any given power can most efficiently be obtained when one combination of settings is used, but can most safely be obtained—with regard to stability of the craft for example—when a second set of settings is used. Cross country cruising may well call for most efficient operation of the engine to conserve fuel and increase range of operation, while maneuvering in the vicinity of airports of departure and arrival, and particularly performance of automatically controlled landings, require conditions of maximum safety. Accordingly a control apparatus of general utility must be arranged to give either type of operation as desired.

The theoretical basis for the structure described below is to be found in the statement that if the pitch attitude and attack angle of an aircraft are controlled, the craft must inevitably proceed at a constant rate of climb, regardless of variations in trim, loading, center of gravity, reduced lift, fuel quality, and so on. This is a radically different approach to power control, heretofore taught only in the copending application of Schuck and Alderson, Serial No. 68,238, filed December 30, 1948, and assigned to the assignee of the present application. The present structure is an improvement on the structure there disclosed.

It can also be shown that if the craft is proceeding along a linear flight path with a fixed pitch attitude and a fixed attack angle, and the attack angle is changed by a selected angle, the flight path of the craft is changed by the same angle. Advantage can be taken of this principle in automatic landing: if the attack angle is increased by an amount equal to the angle of the radio established glide path, automatic landings can be accomplished by superimposing on the attack angle control system a further control in accordance with vertical departure of the craft from the glide path, to give an integrated arrangement for controlling a craft either in cross-country flight or in automatic landing.

*Objects of the invention*

It is a primary object of the invention to provide an improved attack angle control apparatus for powered aircraft.

An object of the invention is to provide, as a component of such apparatus, power stabilizing apparatus including engine speed adjusting and manifold pressure selecting means, control means causing operation of the adjusting means in accordance with operation of the selecting means, and means for actuating the selecting means, together with means modifying the operation of the control means in accordance with altitude, and with means oppositely controlling the engines in accordance with any difference in their speeds, to make them run at the same speed.

A further object of the invention is to provide, in power stabilizing apparatus as just described, adjusting means for each of a number of engines and selecting means common to all the engines.

A further object of the invention is to provide means preventing operation of the manifold pressure or throttle adjusting apparatus of a plurality of engines, in a direction to increase the manifold pressures, when the mean manifold pressure of the engines exceeds a limiting value, and to provide adjustable means for selecting the limiting value, which means may be actuated simultaneously with the engine speed and manifold pressure selecting means.

A more detailed object of the invention is to provide, in a throttle control apparatus, a manifold pressure selector, a throttle adjusting motor, means responsive to actual manifold pressure, means responsive to throttle position, and balanceable means controlling the motor in accordance with operation of the manifold pressure selector, in such a fashion that as long as the manifold pressure is less than 18 inches of mercury the balancing is accomplished primarily in accordance with the throttle position response, while for larger pressures the balancing is accomplished primarily in accordance with the manifold pressure response.

Another detailed object of the invention is to provide, in power stabilizing apparatus as described above, a number of selectors for each engine condition, having different selecting characteristics, and means for placing sets of selectors in control of the adjusting and limiting apparatus in accordance with particular desired conditions of flight.

Another object of the invention is to provide, in apparatus as described above, motor means for actuating the selecting means either in accordance with deviation of the attack angle of the craft from a desired value, or in accordance with the mean engine governor position.

Another detailed object of the invention is to provide an indicator for warning the human pilot when the power selected in response to the attack angle control apparatus requires a large proportion of the total available power of the engine, so that he may change his mixture control setting from auto lean to auto rich.

A detailed object of the invention is to provide an indicator which is continuously operated when the power stabilizing apparatus is in full operation, which is intermittently operated when the power stabilizing apparatus is not in operation but may safely be put in operation, and which is not operated at all at any other time.

Another detailed object of the invention is to provide an indicator which is continuously operated when the attack angle apparatus is in full operation, which is intermittently operated when the attack angle apparatus is not in operation but may safely be put in operation, and which is not operated at all at any other time.

Another object of the invention is to provide an attack angle control apparatus including attack angle responsive means, attack angle selecting means, and means normally giving a controlling output when the two means just defined are not in agreement, and operable to give a centering output which brings the selecting means into agreement with the responsive means.

Another broad object of the invention is to provide, as a further component of the over-all apparatus, an attack angle control apparatus in which there is exercised direct control of the throttle and reset control of both throttles and engine governors, in accordance with deviation of the attack angle of the craft from a desired value, and in which this arrangement can be converted by a switching arrangement, into centering controls in the engine speed and the attack angle control components.

A further broad object of the invention is to provide attack angle control apparatus, as defined above, which is effective to normally maintain the craft in level flight, together with means modifying the apparatus to maintain the craft in movement along a sloping glide path, and means insuring that a particular set of selectors is in use while the modified operation of the apparatus continues.

Yet another object of the invention is to provide apparatus as described above, in which one of the sets of selectors is fixed rather than adjustable, together with means, operable only when the apparatus is modified for gliding rather than level flight, for substituting the fixed selectors for the adjustable selectors, to give preselected power control rather than attack angle responsive power control, and for simultaneously establishing the centering condition of the attack angle and power selecting components.

A further detailed object of the invention is to provide means preventing engagement, or initiation of operation, of the attack angle apparatus if the craft is already proceeding along the glide path, but not interrupting that engagement when the craft begins to follow a glide path if the engagement was previously completed.

Another detailed object of the invention is to provide means preventing engagement of the attack angle apparatus unless the power stabilizing apparatus of at least one engine is in operation, and permitting operation of the attack angle apparatus thereafter as long as the power stabilizing apparatus for either engine is in operation.

A still further broad object of the invention is to provide attack angle control apparatus including means selecting a desired attack angle and means causing the craft to fly at the selected angle, together with means increasing the selected attack angle as a function of bank angle whenever the craft rolls.

Various other objects, advantages, and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

*The drawing*

Figure 2:
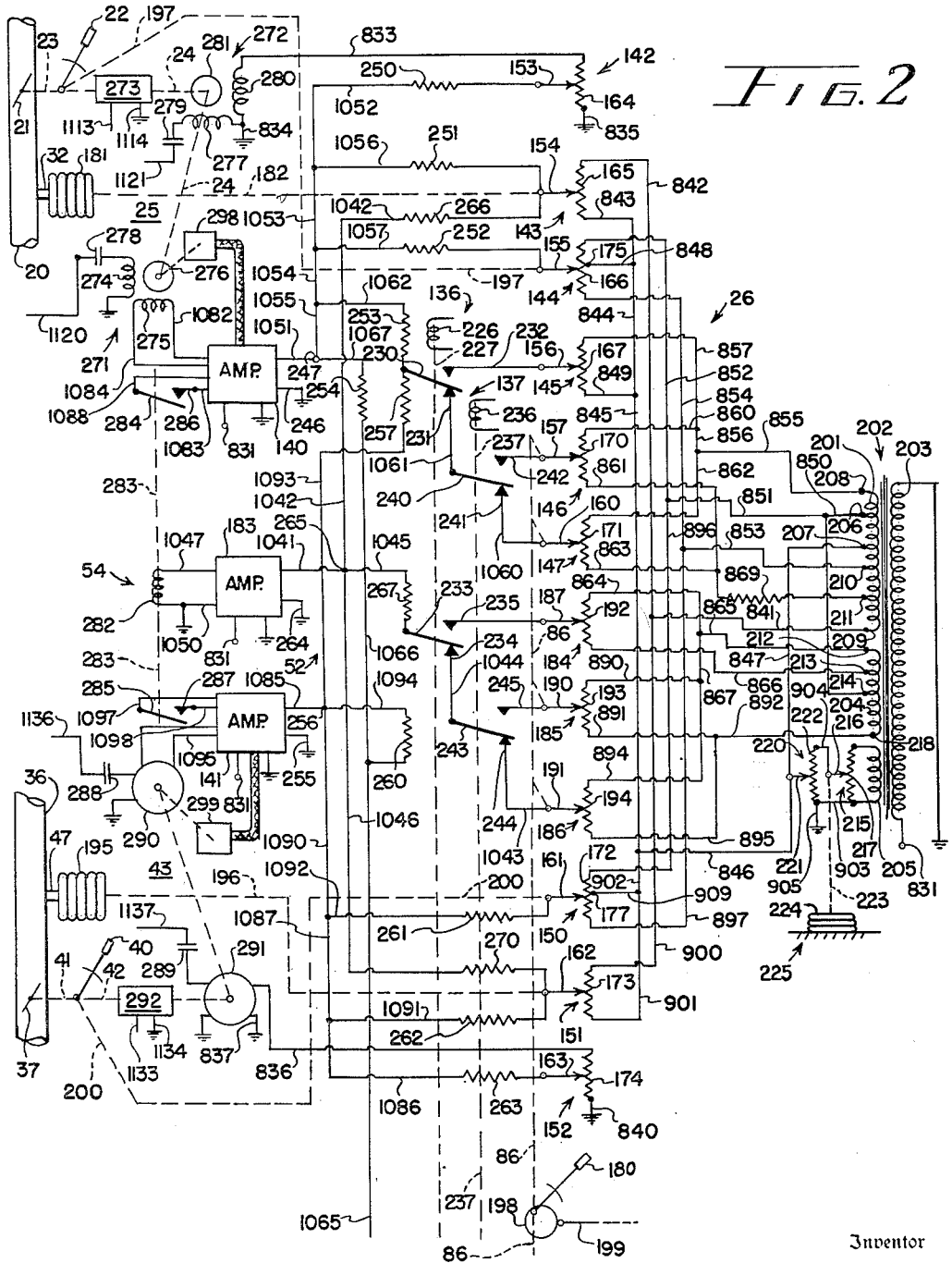
Figure 3:
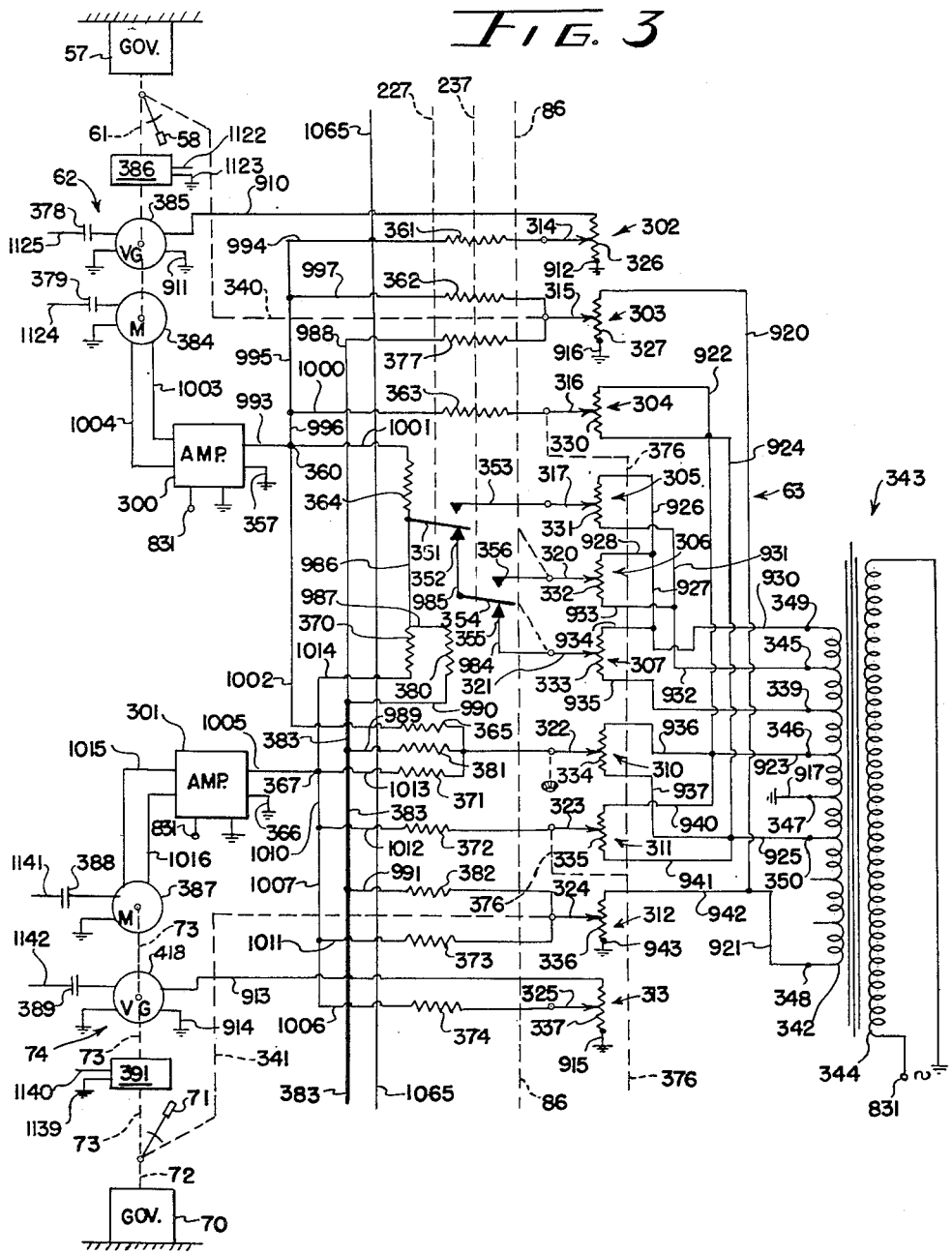
Figure 4:
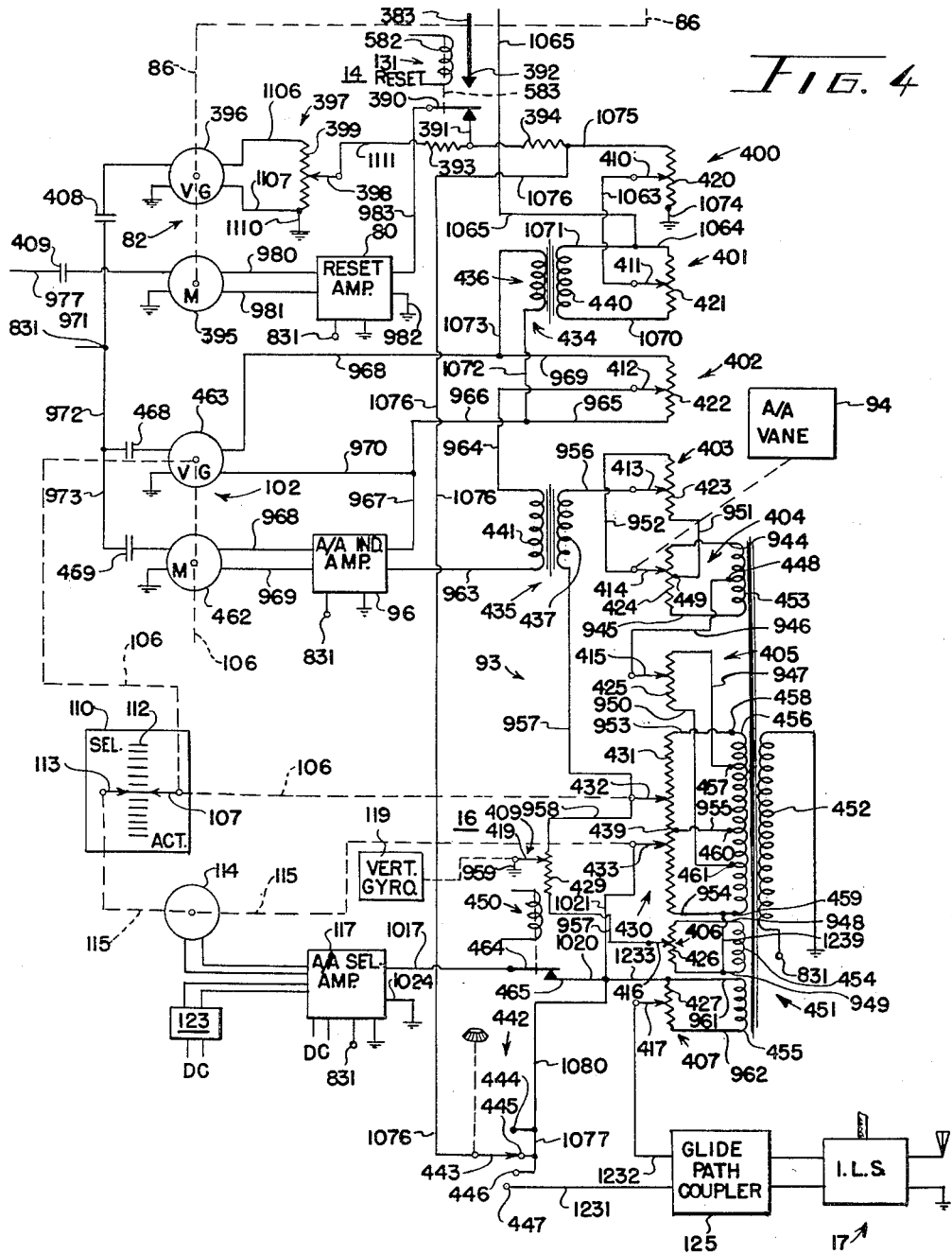
Figure 5:
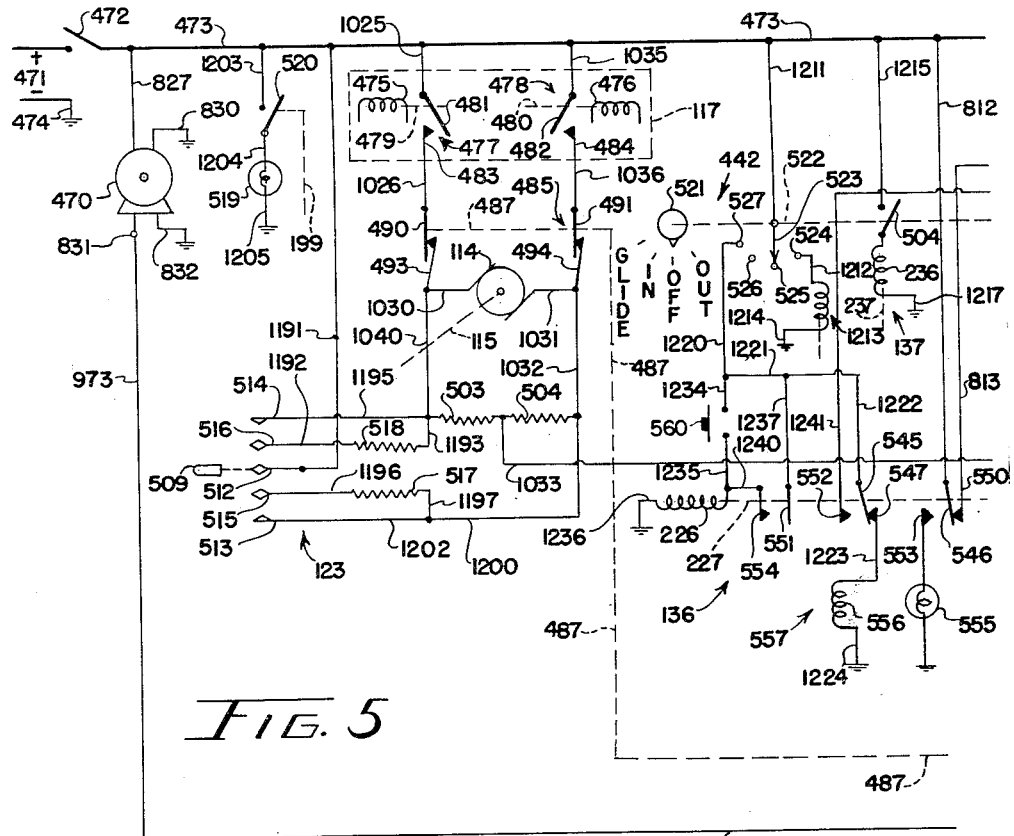
Figure 6:
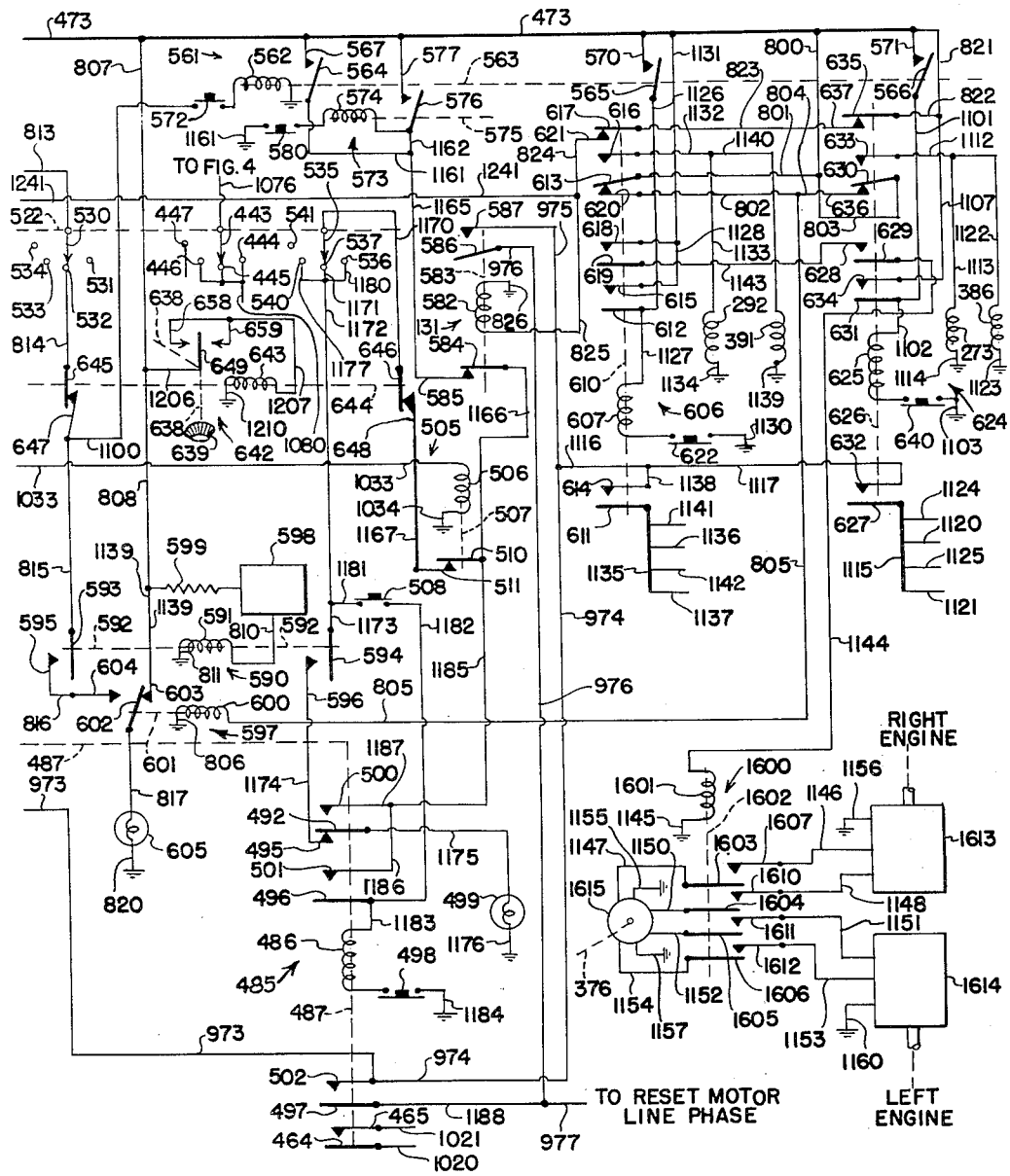

In the drawing: Figure 1 is a functional showing of the apparatus as a whole;

Figures 2, 3, and 4 together comprise a more detailed showing of the controlling portions of the apparatus, Figure 2 being primarily concerned with throttle control, Figure 3 with R. P. M. control, and Figure 4 with attack angle control;

Figures 5 and 6 together comprise a more detailed showing of the supervisory portion of the apparatus as a whole;

Figures 7, 8, and 9 are diagrams showing the relation upon which design of certain components of the apparatus is based;

Figures 10 to 16 inclusive are fragmentary showings of apparatus designed according to Figures 7, 8, and 9, and Figure 17 is a fragmentary showing of details of a portion of Figure 2.

*General description*

The invention is shown in Figure 1 to be made up of power stabilizing apparatus 10—comprising MAP control means 11 and R. P. M. control means 12, the former including MAP limit means 13 and the latter including reset means 14 regulating the operation of a power selector 15 which controls both components—and attack angle control apparatus 16 comprising an input from the glide path receiver 17 of the instrument landing system.

The intake manifold of the right engine of the craft is shown at 20, and includes a throttle 21 normally actuated by a manual lever 22 through a mechanical connection 23. The output shaft 24 of a right MAP servo unit 25 having a power conection 31 is connected to operate lever 22 and throttle 21, and to provide a mechanical adjustment in a MAP network 26 having a power connection 35. Operation of servo unit 25 is controlled by network 26 through an energizing connection 27, and a feedback connection 30 from servo unit 25 to network 26 is provided for antihunt purposes. Manifold 20 is tapped at 32 for operation of a pressure responsive unit 33, which supplies a controlling signal to network 26 through a connection 34.

The intake manifold of the left engine of the craft is shown at 36, and includes a throttle 37 normally actuated by a manual lever 40 through a mechanical connection 41. The output shaft 42 of a left MAP servo unit 43 having a power connection 46 is connected to operate lever 40 and throttle 37, and to provide a mechanical adjustment in MAP network 26. Operation of servo unit 43 is controlled by network 26 through an energizing connection 44, and a feedback connection 45 from servo unit 43 to network 26 is provided for antihunt purposes. Manifold 36 is tapped at 47 for operation of a pressure responsive unit 50, which supplies a controlling signal to network 26 through a connection 51.

Members 20 to 51 inclusive comprise MAP control means 11 of power stabilizing apparatus 10.

MAP limit means 13 includes a network 52 having a power connection 53, and controlling the operation of a relay 54 through a connection 55. Relay 54 controls the energization of servo units 25 and 43 through connections 27 and 44. Operation of limit network 52 is controlled through a connection 56 by throttle network 26.

The propeller pitch governor of the right engine of the craft is shown at 57 to be normally actuated by an R. P. M. lever 58 through a mechanical connection 60. The output shaft 61 of a right R. P. M. servo unit 62 having a power connection 66 is connected to operate lever 58 and governor 57, and to provide a mechanical adjustment in a R. P. M. network 63 having a power connection 67. Operation of servo unit 62 is controlled by network 63 through an energizing connection 64, and a feedback connection 65 from servo unit 62 to network 63 is provided for antihunt purposes. A pair of inputs 68 and 69 are supplied to network 63 from tachometer generators driven by the two engines, for speed comparison.

The propeller pitch governor of the left engine of the craft is shown at 70 to be normally actuated by an R. P. M. lever 71 through a mechanical connection 72. The output shaft 73 of a left R. P. M. servo unit 74 having a power connection 77 is connected to operate lever 71 and governor 70, and to provide a mechanical adjustment in governor network 63. Operation of servo unit 74 is controlled by R. P. M. network 63 through an energizing connection 75, and a feedback connection 76 from servo unit 74 to network 63 is provided for antihunt purposes.

Members 57 to 76 inclusive comprise R. P. M. control means 12 of power stabilizing apparatus 10.

Reset means 14 is shown to comprise an amplifier 80 having a power connection 81 and controlling a reset servo unit 82 through an energizing connection 83. Servo unit 82 has a feedback connection 84, for a purpose to be set forth, a power connection 85, and an output shaft 86 connected to operate power selector 15, which controls MAP network 26, limit network 52, and R. P. M. network 63 through connections 87, 90, and 91 respectively.

Attack angle component 16 includes an attack angle network 93 having a power connection 100 and normally controlled in accordance with a signal supplied from an attack angle responsive vane 94 through a connection 95. Network 93 supplies a first output to an amplifier 96 through a connection 97. Amplifier 96 has a power connection 101, and controls the operation of an attack angle indicator servo unit 102 through an energizing connection 103: a feedback connection 104 between servo unit 102 and network 93 is provided for antihunt purposes. Servo unit 102 has a power connection 105, and its output shaft 106 provides a mechanical adjustment for network 93, and also actuates one index 107 of an indicator 110 with respect to a scale 112. A second index 113 is actuated with respect to scale 112 by an attack angle selector motor 114 through a mechanical connection 115.

Motor 114 is controlled through an energizing connector 116 from an amplifier 117 having a power connection 120. A second output from network 93 is supplied to amplifier 117 through a connection 122. Motor 114 may also be energized from a power connection 121 through a manual selector 123, a connection 124, and connection 116.

Another signal for network 93 is supplied through a connection 118 from a vertical gyroscope 118, in accordance with the bank angle of the craft relation to the horizontal, and irrespective of the direction of bank.

A further signal for network 93 is supplied by a glide path coupler 125 through a connection 126: coupler 125 is controlled by the glide path channel of the ILS receiver 17, through a connection 127. Network 93 supplies a further output to MAP network 26 through a connection 130, and feedback connection 84 from servo unit 82 extends to network 93.

A reset relay 131 supplies one of two inputs to reset amplifier 80 through a connection 132: the first input is derived from R. P. M. network 63 through a connection 133, and the second is derived from attack angle network 93 through a connection 134.

The apparatus is shown in its normal operating condition. Servo units 25, 43, 62, and 74 are ordinarily positioned so that networks 26 and 63 are balanced at control points determined by the adjusted position of selector 15. R. P. M. servo units 62 and 74 are differentially adjusted in accordance with speed difference between the engines, to adjust R. P. M. network 63 until the engines run at the same speed. Operation of MAP servo units 25 and 43 in one sense is interrupted by relay 54 under the control of limit network 52 if the mean manifold pressure sensed by units 33 and 50 exceeds a selected value determined by operation of power selector 15.

The attack angle sensed by vane 94 is indicated by index 107 through operation of attack angle indicator servo unit 102 under the control of amplifier 96 and network 93. The selected attack angle is indicated by index 113 through operation of selector motor 114, either in accordance with operation of manual selector 123, or in accordance with regular operation of the apparatus by which the selected attack angle is that prevailing when the apparatus is engaged.

Attack angle network 93 supplies on connections 130 and 134 a signal determined by any difference between indicated and selected attack angles, the latter including any glide path signal. The signal on connection 130 controls operation of MAP servo units 25 and 43, which change the throttle settings, thus correcting the attack angle of the craft, and simultaneously balance out the effective signal on network 26. The signal on connection 134 is applied to reset amplifier 80, causing operation of reset servo unit 82 to adjust power selector 15: this operation continues at a slow rate as long as any signal persists on connection 134. Operation of selector 15 changes the balance points of networks 26 and 63, and servo units 25, 43, 62, and 74 are all operated to change the throttle and governor settings, thus also changing the attack angle of the craft, and to readjust networks 26 and 63. Operation of power selector 15 under the control of attack angle network 93 has a reset or load compensation effect on the over-all apparatus. The craft thus proceeds in flight at a fixed attack angle, and hence, since the pitch attitude of the craft is fixed, at a constant altitude or rate of climb.

When it is desired to make an automatic landing, the ILS receiver and glide path coupler are made operative, and the glide path signal in effect changes the selected attack angle by the slope of the glide path and by the amount of departure of the craft from the glide path, thus initiating operation of the power unit to reset the control of the craft for sloping rather than level flight, and to return the craft to the center of the beam.

*MAP components*

With the foregoing general discussion of the apparatus as a guide, the detailed structure of the various devices will be described. Referring first to Figure 2, MAP control network 26 is shown to include portions of a go-around relay 136 and an efficiency-approach relay 137, which extend vertically along the center of the figure, a right throttle amplifier 140, a left throttle amplifier 141, and a plurality of voltage dividers 142, 143, 144, 145, 146, 147, 150, 151, and 152 having sliders 153, 154, 155, 156, 157, 160, 161, 162, and 163 movable with respect to resistance windings 164, 165, 166, 167, 170, 171, 172, 173, and 174 respectively. Winding 166 has an intermediate tap 175, and winding 172 has an intermediate tap 177.

The components of limit network 52 are shown to include relays 136 and 137, an amplifier 183, and a plurality of voltage dividers 184, and 185, and 186 having sliders 187, 190, and 191 movable with respect to resistance windings 192, 193, and 194, all respectively.

Sliders 157, 160, 190, and 191 are connected for simultaneous operation by shaft 86 of reset servo unit 198, to which is fixed a manual operating lever 180. Sliders 153, 156, 163, and 187 are arranged for individual manual adjustment.

Voltage divider 143 is structurally a portion of pressure responsive device 181, slider 154 being moved along winding 165 by bellows 181 through a mechanical connection 182. Similarly voltage divider 151 is structurally a portion of pressure responsive device 50, slider 162 being moved along winding 173 by bellows 195 through a mechanical connection 196. Sliders 154 and 162 are arranged to remain at the bottoms of their respective windings until the MAP in the respective manifolds exceeds 18 inches of mercury, by suitable resilient or lost motion mechanism on connections 182 and 196.

Voltage divider 144 is structurally a portion of servo unit 25, slider 155 being displaced along winding 166 by means of a mechanical connection 197 to the shaft 24 of the servo unit. Similarly voltage divider 150 is structurally a portion of servo unit 43, slider 161 being displaced along winding 172 by means of a mechanical connection 200 to the shaft 42 of the servo unit.

The windings of voltage dividers 143, 144, 145, 146, 147, 150, and 151 are energized from one secondary winding 201 of a transformer 202 having a primary winding 203 and further secondary windings 204 and 205. Winding 201 has terminals 208 and 209 and intermediate taps 206, 207, 210, and 211, and winding 204 has terminals 212 and 213 and intermediate taps 213 and 214.

Associated with winding 205 are a first voltage divider 215 having a slider 216 and a winding 217, and a second voltage divider 220 having a slider 221 and a winding 222. Slider 216 is actuated through a mechanical connection 223 by the bellows 224 of an altitude responsive device 225. Slider 221 is arranged for manual adjustment.

Relay 136 includes a winding 226 which energizes an armature 227 to actuate a pair of movable contacts 230 and 233 out of normal engagement with a pair of fixed contacts 231 and 234 and into engagement with a pair of fixed contacts 232 and 235, and to perform other functions shown in Figures 3 and 5. Figure 5 also shows the energizing circuit for winding 226 of the relay.

Relay 137 includes a winding 236 which energizes an armature 237 to actuate a pair of movable contacts 240 and 243 out of normal engagement with a pair of fixed contacts 241 and 244 and into engagement with a pair of fixed contacts 242 and 245, and to perform other functions shown in Figures 3 and 5. Figure 5 also shows the energizing circuit for winding 236 of the relay.

The input to amplifier 140 includes a ground connection 246 and a summation terminal 247. The input signal for amplifier 140 is the parallel sum of the voltages applied to summation terminal 247 through a plurality of summing resistors 250, 251, 252, 253, and 254.

The input to amplifier 141 includes a ground connection 255 and a summation terminal 256. The input signal for amplifier 141 is the parallel sum of the voltages applied to summation terminal 256 through a plurality of summing resistors 257, 260, 261, 262, and 263.

The input to amplifier 183 includes a ground connection 264 and a summation terminal 265. The input signal for amplifier 183 is a parallel sum of the voltages applied to summation terminal 265 through a plurality of summing resistors 266, 267, and 270.

Servo unit 25 includes, in addition to voltage divider 144, a motor 271, a "velocity generator" 272, and an electromagnetic clutch 273. Motor 271 is of the split phase type and includes a line phase winding 274, with which there is associated a quadrature capacitor 278, and an amplifier phase winding 275 spaced 90 electrical degrees from the first winding about the axis of a rotor 276 carried by shaft 24. As is well known, when the windings of such a motor are energized with alternating voltages in phase quadrature, the motor runs in a forward or reverse direction depending upon which voltage leads the other: when only one winding is energized the motor does not run.

Generator 272 is of the dynamic transformer type, and has a primary winding 277, with which is associated a phasing capacitor 279, and a secondary winding 280 spaced 90 electrical degrees from the axis of a rotor 281 carried by shaft 24. As is well known, when alternating voltage is impressed on the primary winding, no voltage is induced in the secondary winding if the rotor is stationary: if the rotor is in motion a voltage is induced in the secondary winding which varies in amplitude but not in frequency with the speed of the rotor, and which is of one phase or the other according to the direction of rotation of the rotor.

Clutch 273 is of the type which is normally disengaged, but which may be electrically engaged to transmit torque. Associated with clutch 273 there is suitable reduction gearing to make high torque available for operation of throttle 21 while permitting high speed operation of the velocity generator. The energizing circuit for clutch 273 is shown in Figure 6.

The energizing circuits for line phase winding 274 of motor 271 and primary winding 277 of generator 272 are further shown in Figures 5 and 6. Amplifier phase winding 275 of motor 271 is energized from the output of amplifier 140 under the control of relay 54, which is shown in Figure 2 to comprise a winding 282 which actuates an armature 283, displacing a pair of movable contacts 284 and 285 into engagement with a pair of fixed contacts 286 and 287. Limit switch means 298 are also provided to interrupt energization of motor 271 at each end of the traverse of lever 22.

Servo unit 43 is constructed like servo unit 25: it includes, in addition to voltage divider 150, a motor 290, a velocity generator 291, and an electromagnetic clutch 292. The energizing circuits for the line phase winding of motor 290, with which there is associated a quadrature capacitor 288, and the primary winding of generator 291, with which there is associated a phasing capacitor 289, are further shown in Figures 5 and 6, and the energizing circuit for clutch 292 is shown in Figure 6. The amplifier phase winding of motor 290 is energized from amplifier 141 under the control of relay 54, Figure 2, and limit switch means 299 are associated with motor 290.

Amplifiers 140 and 141 are both of the type which supplies an alternating voltage output of one phase or of the opposite phase, according as an input alternating voltage is of the same phase as or of the opposite phase to a comparison alternating voltage, the amplitude of the output varying with that of the input. Amplifier 183 may be of the same type, except that, since the amplifier is required to give no response to signals of reverse phase, components used only when the signal reverses are omitted.

R. P. M. components

Referring now to Figure 3, R. P. M. control network 63 is shown to include portions of relays 136 and 137, a right R. P. M. amplifier 300, a left R. P. M. amplifier 301, and a plurality of voltage dividers 302, 303, 304, 305, 306, 307, 310, 311, 312, and 313, having sliders 314, 315, 316, 317, 320, 321, 322, 323, 324, and 325 movable with respect to resistance windings 326, 327, 330, 331, 332, 333, 334, 335, 336, and 337, respectively.

Sliders 320 and 321 are connected for simultaneous operation by shaft 86 of reset motor 82. Sliders 314, 317, 322, and 325 are arranged for individual manual adjustment. Sliders 316 and 323 are driven by a differential motor shown in Figure 6 through a mechanical connector 376.

Voltage divider 303 is structurally a portion of servo unit 62, slider 315 being displaced along winding 327 by means of a mechanical connection 340 to the shaft 61 of the servo unit. Similarly, voltage divider 312 is structurally a portion of servo unit 74, slider 324 being displaced along winding 336 by means of a mechanical connection 341 to the shaft 73 of the servo unit.

The windings of voltage dividers 303, 304, 305, 306, 307, 310, 311, and 312 are energized from a secondary winding 342 of a transformer 343 having a primary winding 344. Winding 342 has terminals 348 and 349 and intermediate taps 345, 339, 346, 347, and 350.

The armature 227 of relay 136 is shown in Figure 3 to actuate a movable contact 351 out of normal engagement with a fixed contact 352 and into engagement with a fixed contact 353. The armature 237 of relay 137 is shown in Figure 3 to actuate a movable contact 354 out of normal engagement with a fixed contact 355 and into engagement with a fixed contact 356.

The input to amplifier 300 includes a ground connection 357 and a summation terminal 360. The input signal for amplifier 300 is the parallel sum of the voltages applied to summation terminal 360 through a plurality of summing resistors 361, 362, 363, 364, and 365.

The input to amplifier 301 includes a ground connection 366 and a summation terminal 367. The input signal for amplifier 301 is the parallel sum of the voltages applied to summation terminal 367 through a plurality of summing resistors 370, 371, 372, 373, and 374.

Figure 3 shows a further plurality of summing resistors 377, 380, 381, and 382 connected to a summing bus 383 for energization of apparatus shown in Figure 4.

Servo unit 62 is constructed like servo unit 25: it includes, in addition to voltage divider 303, a motor 384, a velocity generator 385, and an electromagnetic clutch 386. The energizing circuits for the line phase winding of motor 384, with which is associated a quadrature capacitor 379, and for the primary winding of generator 385, with which there is associated a phasing capacitor 378, are shown in Figures 5 and 6, and the energizing circuit for electromagnetic clutch 386 is shown in Figure 6. The amplifier phase winding of motor 384 is energized from amplifier 300.

Servo unit 74 is constructed like servo unit 25: it includes, in addition to voltage divider 312, a motor 387, a velocity generator 418, and an electromagnetic clutch 391. The energizing circuit for the line phase winding of motor 384, with which there is associated a quadrature capacitor 388, and the primary winding of generator 418, with which there is associated a phasing capacitor 389, are shown in Figures 5 and 6, and the energizing circuit for electromagnetic clutch 391 is shown in Figure 6. The amplifier phase winding of motor 387 is energized from amplifier 301.

Amplifiers 300 and 301 are both of the type which supplies an alternating voltage output of one phase or of the opposite phase, according as an input alternating voltage is of the same phase as or of the opposite phase to a comparison alternating voltage, the amplitude of the output varying with that of the input.

*Reset and attack angle components*

Figure 4 shows the reset apparatus 14 and the attack angle control apparatus 16. The input to reset amplifier 80 is selected by reset relay 131, which is fragmentarily shown in Figure 4 to include a movable contact 390 actuable out of normal engagement with a fixed contact 391 and into engagement with a fixed contact 392. Relay 131 is more completely described in connection with Figure 6. Summing bus 383 is connected to fixed contact 392, and there are associated with fixed contact 391 a plurality of summing resistors 393 and 394. Amplifier 80 may thus have as its input the parallel sum of the voltages supplied to summing bus 383, or the parallel sum of the voltages supplied at fixed contact 391.

Amplifier 80 is of the same nature as amplifier 140, and controls the operation of reset servo unit 82, which is generally like servo unit 25 except that no magnetic clutch is included, the unit consisting of a motor 395 and a velocity generator 396. Reduction gearing between velocity generator 396 and output shaft 86 is desirable. The circuit for the line phase winding of motor 395 is separate from that energizing the primary winding of generator 396: the former is shown in Figures 5 and 6 and the latter in Figure 5. The amplifier phase winding of motor 395 is energized from amplifier 80. Associated with generator 396 is a voltage divider 397 having a slider 398 movable along a resistance winding 399.

The components of attack angle control network 93 are shown in Figure 4 to include a plurality of voltage dividers 400, 401, 402, 403, 404, 405, 406, 407, and 409, having sliders 410, 411, 412, 413, 414, 415, 416, 417, and 419 movable with respect to windings 420, 421, 422, 423, 424, 425, 426, 427, and 429, all respectively. Network 93 also includes: a voltage divider 430 having a winding 431, tapped at 439, with respect to which a pair of sliders 432 and 433 are independently movable; a pair of isolation transformers 434 and 435 having primary windings 436 and 437 and secondary windings 440 and 441 respectively; a portion of a function selector 442, shown most completely in Figures 5 and 6, comprising a switching contact 443 and a plurality of fixed contacts 444, 445, 446, and 447; and a transformer 451 having a primary winding 452 and a plurality of secondary windings 453, 454, 455, and 456. Winding 453 is tapped at 458, and winding 456 has terminals 458 and 459 and intermediate taps 457, 460, and 461.

Servo unit 102, like servo unit 82, has no electromagnetic clutch; it comprises a motor 462 and a velocity generator 463. Reduction gearing between velocity generator 463 and output shaft 106 is desirable. The circuit energizing the line phase winding of motor 462, with which is associated a quadrature capacitor 469, and the circuit energizing the primary winding of generator 463, with which is associated a phasing capacitor 468, are shown in Figure 5. The amplifier phase winding of motor 462 is energized from amplifier 96. The shaft 106 of servo unit 102 is shown in Figure 4 as continued downward to perform bank limiting and stall prevention functions in an automatic pilot as described in my copending application referred to above.

Figure 4 also shows the manner in which network 93 energizes amplifier 117 through relay 450, which is fragmentarily shown to include a movable contact 464 which may be actuated out of normal engagement with a fixed contact 465 when the relay is energized. The complete structure of relay 450, and its energizing circuit, are shown in detail in Figures 5 and 6, which also show more clearly than Figure 4 the relation between amplifier 117, motor 114 and attack angle selector 123.

Amplifiers 80 and 96 are of the same type as amplifier 140, and amplifier 117 is generally the same, except that it provides two alternative outputs instead of a single reversing output. This also is well known: an example of one suitable amplifier for this use is given in Gille and Field Patent 2,425,374. Motor 114 is a reversible permanent magnet D. C. motor.

*Supervisory components*

The circuits described in connection with Figures 2, 3, and 4 are arranged for energization with alternating voltage. As shown in Figures 5 and 6, to which reference should now be made, this alternating voltage is supplied by an inverter 470 energized from a source 471 of direct current, conveniently the battery of the aircraft. A master switch 472 controls the energization of a positive bus 473 from source 471. Amplifier 117 is shown in Figure 5 as arranged to energize one or the other of the windings 475 and 476 of a pair of relays 477 and 478, according as the input to the amplifier is of one phase or of the opposite phase. The armatures 479 and 480 of relay 477 and 478 actuate movable contacts 481 and 482 into engagement with fixed contacts 483 and 484, all respectively, to cause operation of motor 114 in a forward or reverse direction depending on which relay is energized. This operation takes place under control of a relay 485, the coil 486 of which is shown in the lower portion of Figure 6 to actuate an armature 487, displacing movable contacts 490, 491, and 492 out of normal engagement with fixed contacts 493, 494, and 495: the armature simultaneously actuates movable contacts 464, 492, 496, and 497 into engagement with fixed contacts 465, 500, 501, and 502.

A pair of fixed resistors 503, 504 are associated with motor 114 in order to make reversing operation of the motor possible. Also associated with motor 114 is a relay 505, appearing near the center of Figure 6, which has a coil 506 actuating an armature 507 to displace a movable contact 510 out of normal engagement with a fixed contact 511.

Attack angle selector 123 is also associated with motor 114, and is shown to comprise a central movable contact 512 having a manual operating knob 509, a pair of outer fixed contacts 513 and 514, and a pair of resilient intermediate contacts 515 and 516 with which are associated dropping resistors 517 and 518.

Function selector 442 is also shown more completely in Figures 5 and 6 than in Figure 4. A manual knob 521 is effective through a mechanical connection 522 not only to actuate switching arm 443 with respect to its fixed contacts, as shown in Figure 6, but also to actuate switching arm 523 with respect to fixed contacts 524, 525, 526, and 527, switching arm 530 with respect to fixed contacts 531, 532, 533, and 534, and switching arm 535 with respect to fixed contacts 536, 537, 540, and 541. An index is also provided on knob 521 so that the position of the selector may easily be read from a scale.

A number of further relays are included in Figures 5 and 6. The coil 226 of go-around relay 136 is shown in the lower portion of Figure 5 to actuate armature 227 to displace movable contacts 545 and 546 out of normal engagement with fixed contacts 547 and 550, and to displace movable contacts 545 and 546 and 551 into engagement with fixed contacts 552, 553, and 554: these functions are in addition to those shown in Figures 2 and 3. A signal lamp 555 is associated with fixed contact 553, and the coil 556 of a glide path relay 557 is associated with fixed contact 547: relay 557 is in fact a portion of coupler 125, and operates to make the coupler output effective in network 93 as shown in Figure 1. A manual switch or go-around button 560 is associated with relay 136.

A master engage relay 561 extending across the upper portion of Figure 6 is shown to comprise a coil 562 which actuates an armature 563, displacing movable contacts 564, 565, and 566 into engagement with fixed contacts 567, 570, and 571. A normally open momentary contact switch or master engage button 572 is associated with relay 561.

An elevator engage relay 573 is shown to comprise a coil 574 which actuates an armature 575 to displace a movable contact 576 into engagement with a fixed contact 577. Relay 573 performs other functions in connection with the automatic pilot of the craft, as shown in my copending application referred to above. A normally closed, momentarily actuated switch or elevator disengage button 580 is associated with relay 573.

Reset relay 131 is shown in the upper central portion of Figure 6 to comprise a coil 582 which actuates an armature 583 to displace a movable contact 584 out of normal engagement with a fixed contact 585, and to displace a movable contact 586 into engagement with a fixed contact 587. These functions are in addition to those described in connection with Figure 4.

A flasher relay 590 is shown in the center left portion of Figure 6 to comprise a coil 591 which actuates an armature 592 to displace movable contacts 593 and 594 into engagement with fixed contacts 595 and 596. Associated with relay 590 are a flasher 598 and a dropping resistor 599.

A light transfer relay 597 is shown just below relay 590 to comprise a coil 600 which actuates an armature 601 to displace a movable contact 602 out of normal engagement with a fixed contact 603 and into engagement with a fixed contact 604. A signal lamp 605 is associated with relay 597.

A left power control relay 606 is shown in the upper right hand portion of Figure 6 to comprise a winding 607 which actuates an armature 610 to displace movable contacts 611, 612, 619, and 613 into engagement with fixed contacts 614, 615, 618, and 616, and to displace movable contacts 613 and 617 out of normal engagement with fixed contacts 620 and 621. Associated with relay 606 is a normally closed, momentary actuated switch or left power disengage button 622: the electromagnetic clutches 292 and 391 of servo units 43 and 73 are associated with relay 606.

A right power control relay 624 beside relay 606 is shown to comprise a winding 625 which actuates an armature 626 to displace movable contacts 627, 631, 629, and 630 into engagement with fixed contacts 632, 634, 628, and 633, and to displace movable contacts 630 and 635 out of normal engagement with fixed contacts 636 and 637. Associated with relay 624 is a normally closed momentary actuated switch or right power disengage button 640: the electromagnetic clutches 273 and 386 of servo units 25 and 62 are associated with relay 624.

A turn control relay 642 is shown to comprise a winding 643 which actuates an armature to displace movable contacts 645 and 646 out of engagement with fixed contacts 647 and 648 respectively. Associated with relay 642 is a turn control knob 639 which may be manually related to control the heading of the craft through a mechanical connection 638. A movable contact 649 is so actuated by connection 638 that whenever knob 639 is not in a central position movable contact 649 is in engagement with one or the other of two fixed contacts 658 and 659.

A synchronizer relay 1600 is shown to comprise a coil 1601 which actuates an armature 1602 to displace movable contacts 1603, 1604, 1605, and 1606 into engagement with fixed contacts 1607, 1610, 1611, and 1612. A tachometer generator or three phase alternator 1613, driven by the right engine of the craft to give a voltage varying in frequency with the speed of the engine, is associated with fixed contacts 1607 and 1610, and a similar tachometer generator 1614, driven by the left engine of the craft to give a voltage varying in frequency with the speed of the engine is associated with fixed contacts 1611 and 1612.

A differential motor 1615 is associated with movable contacts 1603, 1604, 1605, and 1606, and is connected in driving relation to shaft 376 of Figure 3. Motor 1615 is of the type wherein two three phase synchronous power units connected to shaft 376 through a mechanical differential. The motors operate in such directions that when they are running at the same rate, which occurs when the energizing voltages are of the same frequency, no mechanical rotation of the shaft is caused. If the energizing voltages are not of the same frequency, the power units do not rotate at the same speed, and mechanical rotation of the shaft is brought about in proportion to the difference between the two frequencies.

*Special structural details*

Before proceeding to describe the operation of the apparatus, the characteristics of the windings of certain voltage dividers should be pointed out. The windings concerned are principally those making up power selector 15 and identified in Figures 2 and 3 by reference numerals 170, 171, 193, 194, 332, and 333.

Figure 7 shows a relation which has been found desirable between displacement of the power control lever and resulting MAP; Figure 8 plots against lever displacement desirable limiting values of MAP, and Figure 9 plots against lever displacement desirable values of engine R. P. M. It must be realized that these conditions are not independent, but express a single coordinated condition of engine operation, for each of two flight conditions—a first condition of maximum efficiency, and a second condition of maximum safety.

Considering for example the most efficient operation of the engines, Figures 7, 8, and 9 show that with the power control lever at its minimum position, the preferred MAP is twelve inches, the preferred MAP limit is 36 inches and the preferred speed is 1400 R. P. M. When the lever has been advanced 28.8 degrees, out of a possible 90 degrees, the preferred MAP is 31 inches, an increase of 19 inches, but the preferred MAP limit and engine speed remain the same. A study of the chart shows that the preferred engine conditions do not vary in the same fashion, either for the efficiency or safety conditions of flight, for various positions of the power control lever. It is therefore necessary to devise a control unit which gives varying control effects upon operation through a given range.

This is accomplished in my power selector by the provision of identical resistance windings which are shunted at various points along their lengths by fixed resistors of selected resistance, which in some cases is zero, and where necessary resistors of proper value are connected in series with the windings to give desired output voltages when the sliders are at their extreme positions.

Figure 10 shows winding 170 to be divided into first, second, third, and fourth portions by taps at 28.8 degrees, 53.6 degrees and 78 degrees. A resistor 650 is connected in series with winding 170, and resistors 651, 652, and 653 are shunted across the first, second, and third portions of the winding.

Figure 11 shows winding 171 to be divided into first, second, and third portions of taps at 68 degrees and 78 degrees. A resistor 654 is connected in series with winding 171, and resistors 655 and 656 are shunted across the first and second portions of the winding.

Figure 12 shows winding 194 to be divided into first, second, and third portions by taps at 28.8 degrees and 78 degrees. A resistor 657 is connected in series with winding 194, and resistors 660 and 661 are shunted across the first and second portions of the winding.

Figure 13 shows winding 193 to be divided into first, second, and third portions by taps at 68 degrees and 78 degrees. A resistor 662 is connected in series with winding 193, and resistors 663 and 664 are shunted across the first and second portions of the winding.

Figure 14 shows winding 333 to be divided into first, second, third, and fourth portions by taps at 28.8 degrees, 53.6 degrees, and 78 degrees. A resistor 665 is connected in series with winding 333, and resistors 666, 667, and 670 are shunted across the first, third, and fourth portions of the winding.

Figure 15 shows winding 332 to be divided into first, second, and third portions by taps at 68 and 78 degrees. A resistor 671 is connected in series with winding 332, and resistors 672 and 673 are shunted across the first and third portions of the winding.

Resistors 660, 663, 666, and 672 are shown to be of essentially zero resistance.

Figure 16:
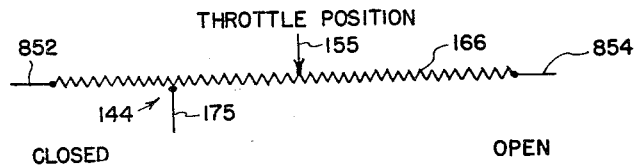

Figure 16 shows winding 166 upon an enlarged scale to illustrate a particular feature of this winding and winding 172. The effective length of each of these windings is made the same as the travel of the throttle positioning device. Tap 175 is so positioned that slider 155 is at that location on winding 166 when the MAP of the engine in question is 18 inches. The same mode of location is used for tap 177 of winding 172.

Figure 17 illustrates the interrelation among motor 271, amplifier 140, relay 54, and limit switch means 298. Amplifier 140 is of the well known type in which a pair of triodes 1248 and 1249 have their plates energized out of phase and their grids energized in phase, with alternating voltage of a selected frequency. One of the triodes discharges more than the other, according as the grid signal is in phase or out of phase with the plate signal. When triode 1248 discharges, motor 271 runs in a direction to open the throttle to which it is connected.

The amplifier is modified by the provision of a pair of cathode resistors 1251 and 1252, and the shaft 24 of motor 271 is extended to carry a cam 1253. Mounted in juxtaposition to cam 1253 in any suitable portion are a pair of single pole single throw normally closed switches 1254 and 1255. When motor 271 has driven the throttle lever to its full open position cam 1253 opens switch 1254. When motor 271 has driven the throttle lever to its full closed position cam 1253 opens switch 1255. For all other positions of the throttle lever both switches are closed.

Operation

When it is desired to put the apparatus into operation, the craft is first brought into a condition of flight at a desired air speed, altitude, pitch attitude, and rate of climb, by normal manual operation of the throttle and R. P. M. levers and aileron, rudder, and elevator trim controls. In doing this it is customary to adjust the engines so that they are operating as closely as possible at the same speed. When these adjustments have been made, a desired pitch attitude and attack angle for the craft have in effect been selected for the condition of level flight (zero rate of climb) at a selected airspeed.

Under these conditions sliders 154 and 162 (Figure 2) have been set at particular positions on windings 165 and 173 by operation of pressure responsive members 181 and 195. Operation of levers 22 and 40 has brought sliders 155 and 161 to particular positions on windings 166 and 172; operation of R. P. M. levers 58 and 71 (Figure 3) has similarly brought sliders 315 and 324 to particular positions on windings 327 and 336. Slider 414 (Figure 4) has been positioned on winding 424 in accordance with the attack angle of the craft as sensed by vane 94, and slider 216 (Figure 2) has been positioned on winding 222 in accordance with the altitude of the craft as sensed by altitude responsive unit 225. With the function selector, turn control knob, control stick, and go-around and efficiency-approach relays in their normal conditions, master switch 472 is closed.

Preliminary energization

A circuit may now be traced from the positive terminal of source 471 (Figure 5) through master switch 472, positive bus 473, conductor 800 (Figure 6), conductor 801 contacts 613 and 620 of left power control relay 606, and conductors 802 and 805 to winding 600 of light transfer relay 597, the circuit being completed through ground connection 806. A second circuit connecting conductors 800 and 805 includes conductor 803, contacts 630 and 636 of right power control relay 624, and conductor 804. Movable contact 602 of the light transfer relay is accordingly displaced out of engagement with fixed contact 603 and into engagement with fixed contact 604.

A circuit may also be traced from the positive terminal of source 471 through master switch 472, positive 473, conductors 807 and 808, dropping resistor 599, flasher 598, and conductor 810 to winding 591 of relay 590, the circuit being completed through ground connection 811. Relay 590 accordingly begins to operate and release intermittently, under the control fo flasher 598.

A further circuit may be traced from the positive terminal of source 471 through master switch 472, positive bus 473, conductor 812 (Figure 5), contacts 546 and 550 of go-around relay 136, conductor 813, movable contact 530 (Figure 6) and fixed contact 532 of function selector 442, conductor 814, contacts 645 and 647 of turn control relay 642, conductor 815, contacts 593 and 595 of flasher relay 590, conductor 816, contacts 604 and 602 of light transfer relay 597, and conductor 817 to signal lamp 605, the circuit being completed through ground connection 820. Lamp 605 is accordingly illuminated each time flasher 598 causes flasher relay 590 to bring contacts 593 and 595 into engagement, and accordingly gives a flashing signal indicating that the power control system is not in operation.

A further circuit may be traced from the positive terminal source 471 through master switch 472, positive bus 473, conductors 821 and 822 (Figure 6), contacts 635 and 637 of right power control relay 624, conductor 823, contacts 617 and 621 of left power control relay 606, and conductors 824 and 825, to the winding 582 of reset relay 131, the circuit being completed through ground connection 826. As a result reset relay 131 operates.

A further circuit may be traced from the position terminal source 471 master switch 472, positive bus 473, and conductor 827 (Figure 5) to inverter 470, the circuit being completed through ground connection 830. Operation of inverter 470 accordingly begins and alternating voltage is supplied at the output of the inverter.

Operation of inverter 470 supplies an alternating voltage between an output terminal 831 and a ground connection 832. Amplifiers 89, 96, 117, 140, 141, 183, 300, and 301 derive their electrical energy from inverter 470, and each amplifier is therefore shown as having a first power conductor connected to terminal 831, and a second grounded power conductor. Accordingly, as soon as master switch 472 is closed and inverter 470 begins to operate, the amplifiers begin to warm up preparatory to performing their several functions.

Also connected between terminal 831 and ground are the primary windings of transformers 202, 343, and 451.

The circuits energizing the windings of the voltage dividers in Figure 2 may now be traced. Winding 164 of voltage divider 142 is energized from secondary winding 280 of velocity generator 272 through conductor 833 and ground connections 834 and 835. Similarly, winding 174 of voltage divider 152 is energized from the secondary winding of velocity generator 291 through conductor 836 and ground connections 837 and 840.

Winding 165 of voltage divider 143 is energized from terminal 209 and tap 207 of secondary winding 201 through conductors 841 and 842 and conductors 847, 846, 845, 844, and 843. Winding 166 of voltage divider 144 is energized from terminals 206 and 210 of secondary winding 201 through conductors 850, 851, and 852 and conductors 853 and 854: tap 175 on winding 166 is connected to tap 207 on secondary winding 201 through conductors 847, 846, 845, 844, and 848. Winding 167 of voltage divider 145 is energized from terminal 208 and tap 207 of secondary winding 201 through conductors 855, 856, and 857 and through conductors 847, 846, 845, and 849. Winding 170 of voltage divider 146 is energized from terminal 208 and tap 211 of secondary winding 201 through conductors 855, 856, and 860 and through resistor 869 and conductor 861. Winding 171 of voltage divider 147 is energized from terminal 208 and tap 211 of secondary winding 201 through conductors 855 and 862 and through resistor 869 and conductor 863.

Winding 192 of voltage divider 184 is energized from terminal 212 and tap 213 of secondary winding 204 through conductors 865 and 864 and through conductor 866. Winding 193 of voltage divider 185 is energized from terminals 212 and 218 of secondary winding 204 through conductors 865, 867, and 890, and conductors 892 and 891. Winding 194 of voltage divider 186 is energized from terminals 212 and 218 of secondary winding 204 through conductors 865, 867, and 894 and conductors 892 and 895. Winding 172 of voltage divider 150 is energized from taps 206 and 210 of secondary winding 201 through conductors 850, 851, and 896 and conductors 853 and 897: tap 177 on winding 172 is connected to tap 207 on secondary winding 201 through conductors 847, 846, 902, and 969. Winding 173 of voltage divider 151 is energized from terminal 209 and tap 207 of secondary winding 201 through conductors 841 and 900 and conductors 847, 846, 902, and 901.

Winding 217 of voltage divider 215 is energized from secondary winding 205 of transformer 202. Winding 222 of voltage divider 220 is energized from the output of voltage divider 215 by conductors 903 and 904, the former being grounded at 905. Slider 221 of voltage divider 220 is connected to conductors 846 and 847.

The energizing circuits for the windings of the voltage dividers of Figure 3 will now be traced. Winding 326 of voltage divider 302 is energized from the secondary winding of velocity generator 385 through conductor 910 and ground connections 911 and 912. Similarly, winding 337 of voltage divider 313 is energized from the secondary winding of velocity generator 418 through conductor 913, and ground connections 914 and 915.

Winding 327 of voltage divided 303 is energized from terminal 348 and tap 347 of secondary winding 342 through conductors 921 and 920 and ground connections 917 and 916. Winding 330 of voltage divider 304 is energized from taps 346 and 350 of secondary winding 342 through conductors 923 and 922 and conductors 925 and 924. Winding 331 of voltage divider 305 is energized from terminal 349 and tap 345 of secondary winding 342 through conductors 930, 927, and 926, and through conductors 932 and 931. Winding 332 of voltage divider 306 is energized from terminal 349 and tap 345 of secondary winding 342 through conductors 930, 927, and 928 and through conductors 932 and 933. Winding 333 of voltage divider 307 is energized from terminal 349 and tap 339 of secondary winding 342 through conductors 930 and 934 and through conductor 935. Winding 334 of voltage divider 310 is energized from taps 346 and 350 of secondary winding 342 through conductors 923 and 936 and through conductors 925 and 937. Winding 335 of voltage divider 311 is energized from taps 346 and 350 of secondary winding 342 through conductors 923 and 940 and through conductors 925 and 941. Winding 336 of voltage divider 312 is energized from terminal 348 and tap 347 of secondary winding 342 through conductors 921 and 942 and ground connections 917 and 943.

Turning now to Figure 4, winding 424 of voltage divider 404 is energized from secondary winding 453 of transformer 451 through conductors 944 and 945. Center tap 448 of secondary winding 453 is connected by a conductor 946 to the slider 415 of voltage divider 405: winding 425 of this voltage divider is energized from taps 457 and 461 of secondary winding 456 by conductors 947 and 950. Winding 424 of voltage divider 404 has a tap 449, and between this tap and slider 414 the winding 423 of voltage divider 403 is connected by means of conductors 951 and 952. Winding 431 of voltage divider 430 is energized from terminals 458 and 459 of secondary winding 456 by conductors 953 and 954, and tap 460 on secondary winding 456 is connected to tap 439 on winding 431 by conductor 955.

Winding 426 of voltage divider 406 is energized from secondary winding 454 of transformer 451 through conductors 948 and 949. Winding 427 of voltage divider 407 is energized from secondary winding 455 through conductors 961 and 962. Winding 429 of voltage divider 409 is connected to sliders 416 and 432 of voltage dividers 406 and 430 by conductors 957 and 958.

*Attack angle indication*

The input circuit for amplifier 96 may now be traced through conductor 963, secondary winding 441 of transformer 435, conductor 964, slider 412 of voltage divider 402, the portion of winding 422 below the slider, and conductors 965, 966, and 967. Winding 422 is energized in accordance with the secondary voltage of velocity generator 463 through conductors 968 and 969 and conductors 970, 966, and 965. At present motor 462 is not in operation, however, so no voltage is impressed across winding 422 from the velocity generator.

It will be apparent that for any position of slider 415 on winding 425 there is a position of slider 432 on winding 431 such that the sliders are at the same potential, and also that for any position of slider 432 its potential with respect to slider 415 may be varied by adjustment of the latter slider. It will also be apparent that when slider 414 is located at center tap 449 it is at the same potential as center tap 448 on secondary winding 453, and that as slider 414 is displaced from center tap 449 in opposite directions a voltage of opposite phases appears between the slider and center tap 448. This voltage is impressed across winding 423 of voltage divider 403 through conductors 951 and 952, and a portion thereof determined by the position of slider 413 appears between the slider and center tap 448.

Primary winding 437 of transformer 435 is connected to sliders 413 and 432 by conductors 956 and 957 respectively, the latter being grounded at 959 through conductor 958, a portion of winding 429, and slider 419. The voltage impressed on primary winding 437 is the sum of the voltage between slider 432 and tap 439, that between slider 415 and tap 460, and the portion of that between slider 414 and tap 449 determined by the setting of slider 413. Sliders 413 and 415 are manually adjusted so that as index 107 and vane 94 vary throughout a range of values of attack angle from —5 degrees to +22 degrees, sliders 413 and 432 remain at the same potential when index 107 is at the same value of attack angle as the vane.

Whenever the selected attack angle represented by slider 432 and index 107 is not the actual attack angle represented by slider 414 and sensed by vane 94, a voltage is supplied to primary winding 437 proportional to the discrepancy. Since amplifier 96 is now supplied with an input signal, the amplifier phase winding of motor 462 is energized through conductors 968 and 969. The line phase of this motor is energized from terminal 831 through conductors 972 and 973 and quadrature capacitor 469. Motor 462 accordingly operates, the direction of operation being such as to move index 107 until it indicates on scale 112 the actual attack angle as sensed by vane 94. At the same time operation of the motor moves slider 432 to reduce the signal to the amplifier to zero, and velocity generator 463 is also operated. The primary winding of this velocity generator is energized from terminal 831 through conductor 972 and phasing capacitor 468, and accordingly an output voltage appears across the secondary winding of the velocity generator and is impressed upon the winding 422 of voltage divider 402, a portion of this voltage being supplied by slider 412 in the input circuit to amplifier 96 to give the arrangement as a whole antihunt characteristics. When index 107 is properly positioned on scale 112, operation of motor 462 is interrupted.

R. P. M. centering

Energization of reset relay 131 as described above completes a circuit which may be traced in Figures 5 and 6 from terminal 831 through conductors 973, 974, and 975, contacts 587 and 586 of relay 131, conductors 976 and 977, and capacitor 469 shown in Figure 4 to the line phase winding of reset motor 395. The amplifier phase winding of this motor is energized through conductors 980 and 981 from amplifier 80. One input terminal of amplifier 80 is grounded at 982. The other is connected through conductor 983 to movable contact 390 of reset relay 131. Since the relay is energized, movable contact 390 is in engagement with fixed contact 392, and therefore the input to amplifier 80 is determined by the voltages on summing bus 383.

Referring now to Figure 3, it will be seen that slider 315 of voltage divider 303 is connected to summing bus 383 through summing resistor 377 and conductor 988, that slider 322 of voltage divider 310 is connected to summing bus 383 through summing resistor 381 and conductor 989, that slider 324 of voltage divider 312 is connected to bus summing 383 through summing resistor 382 and conductor 991, and that slider 321 of voltage divider 307 is connected to summing bus 383 through conductor 984, contacts 355 and 354 of relay 137, conductor 985, contacts 352 and 351 of relay 136, conductors 986 and 987, summing resistor 380, and conductor 990. Sliders 315 and 324 are maintained in fixed position, because as described below the R. P. M. motors 384 and 387 are not in operation, and slider 322 is also fixed: ordinarily in initially setting up the apparatus slider 322 would have been set at the center of winding 334, so that no voltage appears on the slider with respect to ground. Accordingly amplifier 80 is energized for operation in accordance with the parallel sum of two voltages determined by the fixed positions of the engine governors, which have been set by the human pilot, and one voltage which is determined by the present setting of slider 321.

Although commonly used in this connection, the expression "parallel summing" is to a certain extent a misnomer. The voltage on summing bus 383 is not actually equal to the sum of the voltages between ground and sliders 315, 321, 322, and 324, but instead is proportional to the weighted average of these voltages. In the simple case where the voltages are weighted equally, this average is proportional to the sum. In the present case, however, summing resistors 377 and 382 are of twice as great resistance as summing resistors 380 and 381, and the voltages supplied to the latter have twice the weight. This is a convenient means of giving a particular voltage different amounts of authority in different circuits, avoiding the necessity of a separate voltage divider with a different applied voltage for each use of a single condition responsive device. As used herein the word "sum" applied in this connection must be understood to have the meaning defined above.

As will be seen from Figures 3 and 4, the governor position voltages are of one phase and the R. P. M. selector and manual adjustment voltages are of the opposite phase. Whenever the joint effect of these voltages is not zero an input is supplied to amplifier 80 through relay 131 which is in phase with or 180° out of phase with the inverter voltage.

Since the output from amplifier 80 is supplied to the amplifier phase winding of reset motor 395, and the line phase winding of this motor has been shown to be energized, through relay 131 and capacitor 469, with voltage in quadrature to the inverter voltage, the motor runs in a forward or reverse direction determined by the phase of the amplifier output voltage.

The governor position voltages and the manual adjusting voltage are fixed. Operation of motor 395 can however adjust the voltage from summing resistor 380 by moving slider 321 along winding 333. The adjustment is made in a sense to reduce the sum of the voltages to zero: when this is accomplished the amplifier has no input and operation of the motor stops. By this means the R. P. M. selector is brought into agreement with the actual R. P. M. as determined by the average position of the two R. P. M. levers.

It will be appreciated that by suitable changes in the circuit the reset motor can be arranged to center the MAP selector instead of the R. P. M. selector, if this is desired.

Operation of motor 395 affects not only slider 321, but also slider 320 in Figure 3 and sliders 157, 160, 190, and 191 in Figure 2. The positions of all these sliders are hence determined by the manual R. P. M. lever settings established by the human pilot.

Operation of motor 395 also adjusts lever 192 of Figure 2, and cam 198 positions follower 199 accordingly.

Continuing the discussion of Figure 3, it will be seen that the input to amplifier 300 comprises ground connection 357 and a connection 993 to summation terminal 360. Slider 314 of voltage divider 302 is connected to summation terminal 360 by summing resistor 361 and conductors 994, 995, and 996. Slider 315 of voltage divider 303 is connected to summation terminal 360 by summing resistor 362 and conductors 997, 995, and 996. Slider 316 of voltage divider 304 is connected to summation terminal 360 by summing resistor 363 and conductors 1000 and 996. Slider 321 of voltage divider 307 is connected to summation terminal 360 by conductor 984, contacts 355 and 354 of relay 137, conductor 985, contacts 352 and 351 of relay 136, summing resistor 364, and conductor 1001. Slider 322 of voltage divider 310 is connected to summation terminal 360 by summing resistor 365 and conductor 1002.

The position of slider 315 is determined by the setting of R. P. M. lever 58. The position of slider 321 is determined by the operation of motor 395 (Figure 4) and sliders 314 and 322 remain as previously set. The position of slider 316 is determined through mechanical connection 376, by operation of motor 1615 (Figure 6) which is not now energized.

A voltage determined in magnitude and phase by the sum of the voltages on sliders 314, 315, 316, 321, and 322 is impressed on the input to amplifier 300, and appears at the output of the amplifier without phase shift, energizing the amplifier phase winding of motor 384 through conductors 1003 and 1004. The line phase winding of the motor is not energized, however, so that no operation of the motor takes place, and no voltage is supplied by velocity generator 385. Even if motor 384 should "single phase" to a slight extent, clutch 386 is deenergized and no adjustment of governor 57 and slider 315 results.

The input to amplifier 301 in Figure 3 comprises ground connection 366 and a connection 1005 to summation terminal 367. Slider 325 of voltage divider 313 is connected to summation terminal 367 by summing resistor 374 and conductors 1006, 1007, and 1010. Slider 324 of voltage divider 312 is connected to summation terminal 367 by summing resistor 373 and conductors 1011, 1007, and 1010. Slider 323 of voltage divider 311 is connected to summation terminal 367 by summing resistor 372 and conductors 1012 and 1010. Slider 322 of voltage divider 310 is connected to summation terminal 367 by summing resistor 371 and conductor 1013. Slider 321 of voltage divider 307 is connected to summation terminal 367 by conductor 984, contacts 355 and 354 of relay 137, conductor 985, contacts 352 and 351 of relay 136, conductor 986, summing resistor 370, and conductor 1014.

The position of slider 324 is determined by the setting of R. P. M. lever 71. The position of slider 321 is determined by the previous operation of motor 395, and sliders 325 and 322 remain as previously set. The position of slider 323 is determined, through mechanical connection 376, by operation of motor 1615 (Figure 6) which is not now energized.

A voltage determined in magnitude and phase by the sum of the voltages on the sliders is impressed on the input to amplifier 301, and appears at the output of the amplifier without phase shift, energizing the amplifier phase winding of motor 387 through conductors 1015 and 1016. The line phase winding of the motor is not energized, however, so that no operation of the motor takes place and no voltage is supplied by velocity generator 390. Even if motor 387 should "single phase" to a slight extent, clutch 391 is deenergized and no adjustment of slider 324 and governor 70 results.

*Attack angle selector*

The input circuit for amplifier 117 of Figure 4 may be traced through conductor 1017, contacts 464 and 465 of relay 450, conductors 1020 and 1021, slider 433, the portion of winding 431 between sliders 433 and 432, slider 432, conductor 958, the portion of winding 429 above slider 419, the slider, and ground connections 959 and 1024. When the craft is not banked, slider 409 is at the upper end of winding 429, so that slider 432 is at ground potential. The input to amplifier 117 is determined solely by displacement of slider 433 from slider 432, the phase of the input signal being reversed with reversal in the sense of the displacement.

When the signal on amplifier 117 is zero, neither of relays 477 and 478 (Figure 5) is energized. For a signal of one sense, relay 477 is actuated, completing a circuit from positive bus 473 through conductor 1025, contacts 481 and 483, conductor 1026, contacts 490 and 493 of anti-engage relay 485, conductor 1030, motor 114, conductors 1031 and 1032, resistor 504, conductor 1033, and winding 506 of anti-engage relay 505 (Figure 6), the circuit being completed through ground connection 1034. Motor 114 accordingly operates, adjusting slider 433 (Figure 4) until the sliders are aligned and the input to amplifier 117 becomes zero. As long as motor 114 is in operation, anti-engage relay 505 remains energized, interrupting a circuit between contacts 510 and 511 which will presently be explained.

For a signal on the input of amplifier 117 of the opposite sense to that just described, relay 478 of Figure 5 is actuated, completing a circuit from positive bus 473 through conductor 1035, contacts 482 and 484, conductor 1036, contacts 491 and 494 of relay 485, conductor 1031, motor 114, conductors 1030 and 1040, resistor 503, and conductor 1033 to winding 506 of relay 505. Motor 114 accordingly operates, adjusting slider 433 (Figure 4) in the opposite sense until the sliders are again aligned, and the input to amplifier 117 again becomes zero.

At the same time that motor 114 adjusts slider 433 it also positions index 113 with respect to scale 112. Thus as long as motor 114 is energized the two indexes are maintained at the same position of scale 112.

*MAP control disabled*

Turning now to Figure 2, it will be seen that the input to amplifier 183 comprises ground connection 264 and a connection 1041 to summation terminal 265. Slider 154 of voltage divider 143 is connected to summation terminal 265 by summing resistor 266 and conductor 1042. Slider 191 of voltage divider 186 is connected to summation terminal 265 by conductor 1043, contacts 244 and 243 of relay 137, conductor 1044, contacts 234 and 233 of relay 136, summing resistor 267, and conductor 1045. Slider 162 of voltage divider 151 is connected to summation terminal 265 by summing resistor 270 and conductor 1046.

Slider 191 has been set by operation of motor 395, and sliders 154 and 162 are set by pressure responsive bellows 181 and 195. As long as the sum of the responsive voltages is not equal to the third voltage an input is provided to amplifier 183, and relay 54 is energized through conductors 1047 and 1050, actuating armature 283 to bring switching contacts 284 and 285 into engagement with fixed contacts 286 and 287.

Continuing the discussion of Figure 2, it will be seen that the input to amplifier 140 comprises ground connection 246 and a connection 1051 to summation terminal 247. Slider 153 of voltage divider 142 is connected to summation terminal 247 by summing resistor 250 and conductors 1052, 1053, 1054, and 1055. Slider 154 of voltage divider 143 is connected to summation terminal 247 by summing resistor 251 and conductors 1056, 1053, 1054, and 1055. Slider 155 of voltage divider 144 is connected to summation terminal 247 by summing resistor 252 and conductors 1057, 1054, and 1055. Slider 160 of voltage divider 147 is connected to summation terminal 247 by conductor 1060, contacts 241 and 240 of relay 137, conductor 1061, contacts 231 and 230 of relay 136, summing resistor 253, and conductors 1062 and 1055. Slider 410 of voltage divider 400 (Figure 4) is connected to summation terminal 247 by conductor 1063, slider 411 of voltage divider 401, the portion of winding 421 above the slider, conductors 1064 and 1065 (Figures 4, 3, 2) conductor 1066 (Figure 2) summing resistor 254, and conductor 1067.

The voltage supplied to summation terminal 247 through the circuit just traced is shown in Figure 4 to be the series sum of a portion of the voltage across winding 421 and a portion of the voltage across winding 420. The former voltage is derived from secondary winding 440 of isolation transformer 434 through conductor 1070 and conductors 1071 and 1064. Primary winding 436 is energized with the output from velocity generator 463 through conductors 970, 966, and 1072 and through conductors 968 and 1073, to provide an antihunt signal when combined with that from voltage divider 400.

The winding 420 of voltage divider 400 is connected at one end to ground connection 1074 and at the other end, through conductors 1075 and 1076, movable contact 443 and fixed contact 445 of function selector 442, conductors 1077, 1080, and 1021 to slider 433 of voltage divider 430. The connection to winding 410 is completed through a portion of winding 431 of voltage divider 430, slider 432 and ground connection 959. The voltage across winding 420 of voltage divider 400 is thus determined by the difference between the positions of sliders 432 and 433 on voltage divider 430. It has previously been shown that slider 432 is positioned by motor 462 in accordance with operation of vane 94, and that slider 433 is positioned by motor 114 into agreement with slider 432. Accordingly, unless vane 94 moves, no voltage is supplied to amplifier 140 of Figure 2 from slider 410 or from slider 411.

Slider 154 is positioned by MAP responsive device 181, slider 155 has been positioned by lever 22, slider 160 is positioned by motor 395, and sliders 153, 410, and 411 remain as previously set. A voltage determined in magnitude and phase by the sum of the voltages at summation terminal 247 is impressed on the input to amplifier 140, and appears at the output without phase shift, energizing the amplifier phase winding 275 of motor 271 through conductors 1082 and 1084. The line phase winding of the motor is not energized, however, so that no operation of the motor takes place, and no voltage is supplied by velocity generator 272. Even if motor 271 should "single phase" to a slight extent, clutch 273 is deenergized, and no adjustment of slider 155 and throttle 21 results.

The input to amplifier 141 of Figure 2 comprises ground connection 255 and a connection 1085 to summation terminal 256. Slider 163 of voltage divider 152 is connected to summation terminal 256 by summing resistor 263 and conductors 1086, 1087, and 1090. Slider 162 of voltage divider 151 is connected to summation terminal 256 by summing resistor 262 and conductors 1091, 1037, and 1090. Slider 161 of voltage divider 150 is connected to summation terminal 256 by summing resistor 261 and conductors 1092 and 1090. Slider 160 of voltage divider 147 is connected to summation terminal 256 by conductor 1060, contacts 241 and 240 of relay 137, conductor 1061, contacts 231 and 230 of relay 136, summing resistor 257, and conductor 1093. Slider 410 of voltage divider 400 (Figure 4) is connected to summation terminal 256 by conductor 1063, slider 411 of voltage divider 401, the portion of winding 421 above the slider, conductors 1064 and 1065 (Figures 4, 3, 2) summing resistor 260 (Figure 2) and conductor 1094. The voltage supplied to summation terminal 256 through summing resistor 260 is the same as that supplied to summation terminal 247 through summing resistor 254.

Slider 162 is positioned by MAP responsive device 195, slider 161 is positioned by lever 40, slider 160 is positioned by motor 395, and sliders 163, 410, and 411 remain as previously set. A voltage determined in magnitude and phase by the sum of the voltages on summation terminal 256 is impressed on the input to amplifier 141, and appears at the output without phase shift, energizing the amplifier phase winding of motor 290 conductors 1095 and through 1097. The line phase winding of the motor is not energized, however, so that no operation of the motor takes place, and no voltage is supplied by velocity generator 291. Even if motor 290 should "single phase" to a slight extent, clutch 292 is deenergized and no adjustment of slider 161 and throttle 37 results.

The status of the apparatus following upon closing master switch 472 is as follows. The inverter 470 is in operation. Index 107 is maintained in agreement with vane 94, by motor 462, and index 113 is maintained in agreement with index 107, by motor 114. Power control lever 180 and the sliders operated therewith are adjusted to a position such that the selected R. P. M. is maintained equal to the actual R. P. M. Relay 54 is operated. The amplifier phase windings of motors 276, 290, 384, and 387 are energized, but the line phase windings and the electromagnetic clutches of these motors are not energized so that the motors do not run. The primary windings of velocity generators 272, 291, 385, and 390 are deenergized so that no secondary voltages are supplied. Velocity generators 396 and 463 give outputs: the latter gives antihunt operation of motor 462, and modifies the operation of amplifiers 140 and 141. Signal lamp 605 flashes steadily.

*Power stabilization*

The human pilot may now press master engage button 572 of Figure 6. This completes a circuit which may be traced from positive bus 473 through conductor 812 (Figure 5), contacts 546 and 550 of go-around relay 136, conductor 813, contacts 530 and 532 or function selector 442 (Figure 6), conductor 814, contacts 645 and 647 of turn control relay 642, conductor 1100, button 572, and winding 562 of master engage relay 561 to ground.

It is to be noted that operation of master engage button 572 is ineffective to energize relay 561 unless the go-around relay 136 and the turn control relay 642 are both deenergized, and unless the function selector 442 is in its off position, because of interruption of the circuit just traced by contacts 546 and 550, contacts 645 and 647, and contacts 530 and 532 respectively.

Energization of winding 562 causes operation of relay 561, completing the circuits between contacts 567 and 564, contacts 570 and 565, and contacts 571 and 566. These circuits remain completed only as long as button 572 is held down.

*Right power control apparatus*

One function performed by master engage relay is energization of right power control relay 624 through a circuit which may be traced from positive bus 473 through contacts 571 and 566, conductors 1101 and 1102, winding 625, disengage button 640, and ground connection 1103. Relay 624 accordingly operates, completing a holding circuit from positive bus 473 through conductors 821 and 1107, contacts 634 and 631, conductor 1102, winding 625, button 640, and ground connection 1103. Button 572 can now be released without causing relay 624 to become deenergized: this can be caused, however, by momentary operation of button 640 which interrupts the holding circuit.

Operation of relay 624 interrupts at contacts 635 and 637 the energizing circuit for reset relay 131 previously traced, and the reset relay drops out. The energization of the line phase winding of reset motor 393 is accordingly interrupted at contacts 586 and 587, and operation of the motor ceases. The reset relay also interrupts at contact 392 (Figure 4) the circuit energizing the reset amplifier 80 from summing bus 383, and completes a circuit for amplifier 80 through contact 391. The voltage upon this contact is the parallel sum of two voltages one of which is derived from velocity generator 396. The secondary winding of this generator is connected across winding 399 of voltage divider 397 by conductors 1106 and 1107, the latter being grounded at 1110: slider 398 is connected to contact 391 by conductor 1111 and summing resistor 393.

Contact 391 is connected by summing resistor 394 to conductor 1076: it will be recalled that between this conductor and ground there is a voltage proportional to the relative displacement of sliders 432 and 433.

Amplifier 80 is accordingly energized in accordance with the error in attack angle and with the speed of motor 395: since the line phase winding of this motor is deenergized, no operation of the motor is taking place and the velocity generator signal is zero: shaft 86 remains at its last adjusted position.

Operation of right power control relay 624 (Figure 6) interrupts the circuit between contacts 630 and 636, and energizes the clutch 273 of the right throttle servo unit through a circuit which may be traced from the positive bus 473 through conductors 800 and 803, contacts 630 and 633, and conductors 1112 and 1113, the circuit being completed through ground connection 1114.

A right power bus 1115 is energized upon operation of relay 624 through a circuit which may be traced from inverter terminal 831 or Figure 5 through conductors 973, 974, 1116, and 1117, and contacts 632 and 627, all of Figure 6. The line phase winding of the right throttle motor (Figure 2) is energized from right power bus 1115 through conductor 1120 and quadrature capacitor 278, and the primary winding of velocity generator 272 is energized from bus 1115 through conductor 1121 and phasing capacitor 279. Motor 271 can now operate, and a signal proportional to its speed of operation can be added to the input to amplifier 140, which has previously been traced. The input to amplifier 140 has however been reduced to zero in the preliminary operation of the apparatus, so that no immediate operation of motor 271 takes place.

In the condition of the apparatus just described, only two external variables can affect the input to amplifier 140. The first of these is the attack angle of the craft: any change therein causes movement of slider 432 out of alignment with slider 433, changing the voltage applied at summation terminal 247 through summing resistor 254. This voltage change is also impressed on amplifier 117, which energizes motor 114 to adjust slider 433. Motor 114 runs rapidly and quickly brings the sliders into alignment so that any signal on summation terminal 247 from this source is never large and always brief. As far as having any effect in the power control apparatus is concerned, this signal may be disregarded.

The second external variable that can affect amplifier 140 is the manifold pressure of the engine: any change therein results in adjustment of slider 154 by bellows 181, changing the voltage applied at summation terminal 247 through summing resistor 251. Amplifier 140 as a result of this change in voltage energizes motor 271, which adjusts throttle 21 and drives velocity generator 272. The MAP changes as a result of adjustment of throttle 21, and bellows 181 adjusts slider 154 to reduce the signal to the amplifier. When the MAP returns to its former value the input to amplifier 80 is reduced to zero and motor 271 stops. Motor 271 also adjusts slider 155, but in cruising flight this can be disregarded as explained below. No voltage is supplied to summing resistor 254 because motor 114 keeps slider 433 aligned with slider 432. The effect of the voltage of slider 153 is purely antihunt: the signal from generator 272 is adjusted so that it is small compared to the usual operating signals on amplifier 140. However, when the signal to amplifier 140 from all other sources is approaching zero, the signal from slider 153 may become significant if the motor is running too rapidly: it is of a proper phase to cause operation of the motor in the reverse direction, thus quickly reducing the speed of the motor and decreasing the likelihood of overshooting and hunting. This significance is given to the expression antihunt throughout this specification.

The correspondence between actual manifold pressure and throttle position is not reliable for throttle settings resulting in low manifold pressures, while for manifold pressures above about 18 inches of mercury the relation between throttle positions and MAP is quite reliable. For this reason the input circuit for amplifier 140 includes not only voltage divider 143, adjusted by MAP responsive bellows 181, but also voltage divider 144, adjusted in accordance with the position of the throttle lever. As previously pointed out, for values of MAP less than 18 inches, slider 154 is not displaced from its lower stop, so that the slider remains at the potential of slider 221 with respect to ground.

Slider 155 on the other hand is moving along a portion of winding 166 having a substantial voltage gradient: between the full closed position of the throttle and a position corresponding to 18 inches of MAP there is a gradient of 18 volts. Thus, any position of power selector 15 which calls for a manifold pressure less than 18 inches supplies a voltage on slider 160 which is balanced only by adjustment of slider 155 by motor 271, and slider 154 has no effect.

The voltage gradient in winding 166 from tap 175, corresponding to a manifold pressure of 18 inches, to the full open position of the throttle, corresponding to a manifold pressure of 54 inches, is only two volts, while the voltage gradient in winding 165 from 18 inches to 54 inches is 22 volts. It is thus apparent that once the manifold pressure exceeds 18 inches, any signal on amplifier 180 from selector 15 is balanced in large measure by change in MAP, and only to a minor extent by change in throttle position.

Clutch 386 of right R. P. M. servo unit 62 is energized upon operation of right power engage relay 624, through a circuit which may be traced from positive bus 473 through conductors 800 and 803, contacts 630 and 633, and conductors 1112 and 1122, the circuit being completed through ground connection 1123.

The line phase winding of right R. P. M. motor 384 is energized from right power bus 1115 through conductor 1124 and quadrature capacitor 379, and the primary winding of velocity generator 385 is energized from right power bus 1115 through conductor 1125 and phasing capacitor 378. Motor 384 can now operate, and a signal proportional to its speed of operation can be added to the input to amplifier 300, which has previously been traced. The input to amplifier 300 has however been reduced to zero in the preliminary operation of the apparatus, so that no operation of motor 384 takes place, and no external variable is capable of affecting the input to amplifier 300 so long as only relay 624 and not relay 606 as well is energized.

It was earlier pointed out that each of motors 271 and 290 is provided with means limiting its travel, and of course the same provision can be made for motors 384 and 390 if desired. The operation of the limiting means is best understood by referring to Figure 17.

In the normal condition of the apparatus of Figure 17 cathode resistor 1252 is short circuited through a circuit including conductors 1260 and 1261, switch 1255, and conductor 1262, and cathode resistor 1251 is short circuited by a circuit including conductors 1260, 1261, and 1263, switch 1254, conductor 1264, contacts 286 and 284 of relay 282 and conductor 1265. The grids of the triodes are thus unbiased, and with no input signal the triodes conduct equally in alternate half cycles.

If switch 1255 is now opened, the discharge current of triode 1249 flows in resistor 1252 biasing the cathode positively with respect to ground. The bias voltage thus appearing is sufficient to result in substantial cutoff of the triode for the magnitude of the greatest signal anticipated on the grids of the triodes, so that when switch 1255 is open no discharge of triode 1249 can take place and operation of motor 271 in a sense to close the throttle is prevented.

In the same fashion, if switch 254 is open, operation of motor 271 in a sense to open the throttle is prevented. This effect also results, for the same reason, if relay 54 is deenergized to interrupt the circuit of triode 1248 at contacts 286 and 284. The operating circuit for relay 54 will be discussed below.

*Left power control apparatus*

Another function performed by master engage relay 561 is energization of left power control relay 606 through a circuit which may be traced in Figure 6 from positive bus 473 through contacts 570 and 565, conductors 1126 and 1127, winding 607, disengage button 622, and ground connection 1130. Relay 606 accordingly operates, completing a holding circuit from positive bus 473 through conductors 1131 and 1128, contacts 615 and 612, conductor 1127, winding 607, button 622, and ground connection 1130. Button 572 can now be released without causing relay 606 to become disengaged: this can be caused, however, by momentary operation of button 622 which interrupts the holding circuit.

Operation of relay 606 interrupts, at contacts 617 and 621, the energizing circuit for reset relay 131 previously traced, so that the reset relay drops out regardless of whether it is relay 606 or relay 624 which is operated. The effect of deenergization of reset relay 131 has already been explained as interrupting operation of the reset motor and impressing on amplifier 80 an input determined by the error in attack angle, which is maintained zero by operation of motor 114.

Operation of relay 606 (Figure 6) interrupts the circuit between contacts 613 and 620, and energizes the clutch 292 of the left throttle servo unit through a circuit which may be traced from positive bus 473 through conductors 800 and 801, contacts 613 and 616, and conductors 1132 and 1133, the circuit being completed through ground connection 1134.

A left power bus 1135 is energized upon operation of relay 606, through a circuit which may now be traced from inverter terminal 831 through conductors 973, 974, 1116, and 1138 and contacts 614 and 611. The line phase winding of the left throttle motor 290 is energized from left power bus 1135 through conductor 1136 and quadrature capacitor 288, and the primary winding of velocity generator 291 is energized from bus 1135 through conductor 1137 and phasing capacitor 289. Motor 290 can now operate, and a signal proportional to its speed of operation is added to the input to amplifier 141 which has previously been traced. The input to amplifier 141 has however been reduced to zero in the preliminary operation of the apparatus so that no immediate operation of motor 290 takes place.

The external variables capable of affecting the input to amplifier 141 are the attack angle of the craft and the manifold pressure of the left engine. The effect of the former, applied through summing resistor 260, is negligible as described in connection with amplifier 140. Any change in manifold pressure on the other hand results in adjustment of slider 162 by bellows 195, changing the voltage applied at summation terminal 256 through summing resistor 262. Amplifier 141 as a result of this change in voltage energizes motor 290, which adjusts throttle 37 and slider 161, and the MAP changes as a result of adjustment of throttle 37 and bellows 195 adjusts slider 162 to reduce the signal to the amplifier. The relation between MAP and throttle position in rebalancing the input to amplifier 141 for a selected value of MAP is the same as that described in connection with amplifier 140.

Clutch 391 of left R. P. M. motor 387 is energized upon operation of relay 606, through a circuit which may be traced from the positive bus 473 through conductors 800 and 801, contacts 613 and 616, and conductors 1132 and 1140, the circuit being completed through ground connection 1139.

The line phase winding of left R. P. M. motor 387 is energized from left power bus 1135 through conductor 1141 and quadrature capacitor 388, and the primary winding of velocity generator 390 is energized from left power bus 1135 through conductor 1142 and phasing capacitor 389. Motor 387 can now operate, and a signal proportional to its speed of operation can be added to the input to amplifier 301, which has previously been traced. The input to amplifier 301 has however been reduced to zero in the preliminary operation of the apparatus so that no operation of motor 387 takes place, and no external variable is capable of affecting the input to amplifier 301 so long as only relay 606 and not relay 624 as well is energized.

The circuit energizing light transfer relay 597 from positive bus 473 has been shown in Figure 6 to be completed between conductors 800 and 805, in the deenergized condition of relays 624 and 606, both by conductor 801, contacts 613 and 620, and conductor 802, and by conductor 803, contacts 630 and 636, and conductor 804. As long as either of relays 606 and 624 is deenergized, the circuit to relay 597 is completed: when both relays 606 and 624 are energized, the circuit to relay 597 is interrupted and the relay is deenergized. A circuit may now be traced from positive bus 473 through conductors 807, 808, and 1139, contacts 603 and 602, conductor 817, and lamp 605 to ground connection 820. The lamp now shines continuously.

R. P. M. equalization

Operation of relays 606 and 624 simultaneously also completes a circuit which may be traced from positive bus 473 through conductor 1131, contacts 618 and 619 of left power control relay 606, conductor 1143, contacts 628 and 629 of right power control relay 624, and conductor 1144 to winding 1601 of relay 1600, the circuit being completed through ground connection 1145. Relay 1600 operates, connecting tachometer generator 1613 to differential motor 1615 through conductor 1146, contacts 1607 and 1603, and conductor 1147, and through conductor 1148, contacts 1610 and 1604, and conductor 1150, and connecting tachometer generator 1614 to differential motor 1615 through conductor 1151, contacts 1611 and 1605, and conductor 1152, and through conductor 1153, contacts 1612 and 1606, and conductor 1154. The circuit between governor 1613 and motor 1615 is completed through ground connections 1156 and 1155, and that between generator 1614 and motor 1615 is completed through ground connections 1160 and 1157.

Assume first that slides 316 and 323 (Figure 3) happen to be at the centers of their windings when relay 1600 is operated, and that R. P. M. levers 58 and 71 are so set that the engines are running at exactly the same speed. Then the power units of differential motor 1615 are turning at the same speed, no rotation of the rotor results, shaft 376 remains stationary, and sliders 316 and 323 remain at the centers of their windings, so that no voltage is added either to the input of amplifier 300 or to the input of amplifier 301.

If levers 57 and 71 are set so that the right engine runs faster than the left engine, for example, the frequency of the voltage applied to one of the power units of motor 1615 is greater than that applied to the other unit, so that the power units rotate at different rates. Motor 1615 therefore adjusts sliders 316 and 323, by means of mechanical connection 376, in opposite senses along their winding, so that the signal to amplifier 300 is decreased and that to amplifier 301 is increased. Motors 384 and 387 are now energized through amplifiers 300 and 301 for operation in opposite senses, to decrease the speed of the right engine and to increase the speed of the left engine, adjusting sliders 315 and 324 at the same time to balance the amplifier inputs from sliders 316 and 323 which at the same time are decreasing and increasing respectively. When the engines are once more at the same speed, motor 1615 stops, sliders 316 and 322 remain motionless at the particular positions on their windings which they have assumed, the amplifier input becomes zero, and the servomotor stops, leaving levers 58 and 71 and sliders 315 and 324 in new positions.

Another function performed by master engage relay 561 (Figure 6) is energization of elevator engage relay 573 through a circuit which may be traced from positive bus 473 through contacts 567 and 564, conductors 1161 and 1162, winding 574, disengage button 580, and ground connection 1161. Relay 573 is primarily a part of the automatic pilot disclosed more completely in my copending application referred to above, and when operated performs functions resulting in stabilization of the pitch attitude of the craft at the value then prevailing. The exact means whereby this function is performed are not essential to the present invention, so that in the drawing this function has been indicated simply by the extension of armature 575 of relay 573.

Operation of relay 573 also completes a holding circuit which may be traced from positive bus 473 through contacts 577 and 576, coil 574, disengage button 580, and ground connection 1161. Button 572 can now be released without causing relay 573 to become deenergized: this can be caused, however, by momentary operation of button 580 which interrupts the holding circuit.

Operation of relay 573 completes a circuit which may be traced from positive bus 473 through contacts 577 and 576, conductors 1162 and 1165, contacts 585 and 584 of reset relay 131, conductor 1166, contacts 510 and 511 of anti-engage relay 505, conductor 1167, contacts 648 and 646 of turn control relay 642, conductor 1170, switching contact 535 and fixed contact 537 of function selector 442, conductors 1171, 1172, and 1173, contacts 594 and 596 of flasher relay 590, conductor 1174, contacts 495 and 492 of attack angle engage relay 485, and conductor 1175 to lamp 499, the circuit being completed through ground connection 1176. Because of the intermittent operation of flasher relay 590, this circuit is continuously broken and completed at contacts 594 and 596, and lamp 499 flashes steadily.

This circuit cannot be completed if elevator engage relay 573 is not energized, or if reset relay 131, anti-engage relay 505, turn control relay 642, or attack angle engage relay 485 is energized, or if function selector 442 is in its glide position. In the out and in positions of function selector 442 the circuit is completed through conductors 1177 and 1180, respectively, instead of through conductor 1171.

*Manual power adjustment*

Now suppose that the human pilot manually moves lever 180 of Figure 2, thus adjusting sliders 160 (Figure 2) and 321 (Figure 3) with respect to their windings. Slider 191 is also adjusted at the same time, for a reason which will be discussed below. The voltages supplied to amplifiers 140, 141, 300, and 301 through summing resistors 253, 257, 364, and 370, respectively, are changed, unbalancing the amplifier inputs. Motors 271, 290, 384, and 387 are energized and operate in antihunt fashion to adjust sliders 155, 161, 315, and 324 until the amplifier input voltages are again zero, at the same time changing the throttle and propeller pitch governor settings and thus adjusting the power of the craft. Since the pitch attitude of the craft is stabilized by its automatic pilot, the change in power is accompanied by changes in airspeed, rate of climb and attack angle. The latter is sensed by vane 94, and slider 414 (Figure 4) is displaced along winding 424, energizing amplifier 96 through transformer 435: motor 462 operates in antihunt fashion, to adjust slider 432 and index 107. Motion of slider 432 disturbs its relation to slider 433, and amplifier 117 is energized, causing operation of motor 114 to adjust slider 433 and to reset index 113 into agreement with slider 432 and index 107 respectively. While motor 114 is running anti-engage relay 505 is energized and the flashing operation of lamp 499 is interrupted.

If it is desired to change power without changing attack angle, the elevator control may be disabled before the power control is operated: this is done by pressing momentarily on button 580, which interrupts the elevator engage relay holding circuit. The elevator engage relay drops out, releasing control of the pitch axis of the craft by the automatic pilot, and interrupting at contacts 576 and 577 the circuit for lamps 499, which goes out. The power lever is more adjusted to the new value, the craft is brought to the proper pitch attitude for flight, under the new power conditions, at the desired air speed and rate of climb, and then the elevator engage relay is reenergized by operation of master engage button 572.

The same result may be accomplished without disengaging the elevator channel by manual adjustment of the elevator trim control of the automatic pilot performed concurrently with movement of the power control lever.

*Single engine operation*

It sometimes happens that engine trouble requires the craft to proceeed with one engine cut off. This can be accomplished according to the present invention simply by pushing one of the power control disengage buttons 622 and 640. Thus suppose trouble develops in the left engine of the craft; the human pilot presses button 622, interrupting the holding circuit for left power control relay 606, which accordingly becomes deenergized. Energization of left power bus 1135 and hence of the line phase windings of left throttle motor 290 and left R. P. M. motor 387, and of the primary windings of velocity generators 291 and 390, is interrupted at contacts 611 and 614. Energization of clutches 292 and 391 is interrupted at contacts 613 and 616, and light transfer relay 597 is energized at contacts 613 and 620, so that lamp 605 begins to flash instead of operating continuously. Contacts 617 and 621 come into engagement, but the circuit for reset relay 131 is still interrupted at contacts 635 and 637 of right power control relay 624. The circuit to relay 1600 is interrupted at contacts 618 and 619, so that operation of differential R. P. M. motor 1615 is interrupted.

Power control of the right engine, without differential R. P. M. control, is retainede. Lever 180 still operates the sliders connected to shaft 86, and the inputs to amplifiers 140 and 300 can still cause operation of right throttle motor 271 and right R. P. M. motor 384, because the line phase windings are still energized through contacts 627 and 632 of right power control relay 624, and their clutches are still energized through contacts 630 and 633 of that relay. It is necessary to remove differential R. P. M. control, because with one engine not driving its tachometer at all, motor 1615 would otherwise be driven to its stop in the direction of slowing down the other engine, which is undesirable.

When the power control system has been engaged by operation of master engage button 572, the normal throttle and R. P. M. control levers are clutched to their servomotors, and manual operation of the levers is difficult, requiring the human pilot to overcome the torque of the servomotors, which at once results when any lever is displaced because of the amplifier unbalance resulting from the accompanying displacement of the slider adjusted with the lever. As soon as one of the power control relays is deenergized, the related servomotor clutches are released and manual operation of the R. P. M. and throttle levers of the associated engine is made possible.

The status of the apparatus, with both engines operating, is now as follows. Inverter 470 is in operation. Index 107 is maintained in agreement with vane 94, by motor 462, and index 103 is maintained in agreement with index 107, by motor 114. Power control lever 180 is manually operable, reset motor 393 not being energized, and the throttle and R. P. M. servomotors are automatically adjusted to positions determined by the setting of the power control lever, antihunt operation for each servomotor being produced by its velocity generator. Change in attack angle resulting from operation of lever 192 is indicated by index 107. The pitch attitude of the craft is stabilized by suitable means controlled by elevator engage relay 573. Lamp 605 is continuously energized and lamp 499 is flashing. Differential R. P. M. motor 1625 modifies the operation of the left and right R. P. M. motors to keep the engines of the craft running at the same speed for different positions of power lever 192.

If for any reason the attack angle changes, motor 462 operates to adjust index 107 and slider 432, and the output of velocity generator 463 modifies the operation of the throttle servomotor. Operation of motor 114 resulting from this displacement of slider 432 from slider 433 energizes the antiengage relay and interrupts the flashing circuit for lamp 499, as does deenergization of the elevator engage relay, operation of the turn control or the function selector, or disengagement of both power control relays.

Attack angle stabilization

The human pilot may now operate attack angle engage button 508 (Figure 6) to place the apparatus completely in operation. This completes a circuit which may be traced from positive bus 473 through contacts 577 and 576 of elevator engage relay 573, conductors 1162 and 1165, contacts 585 and 584 of reset relay 131, conductor 1166, contacts 510 and 511 of anti-engage relay 505, conductor 1167, contacts 648 and 646 of turn control relay 642, conductor 1170, contacts 535 and 537 of function selector 442, conductors 1171, 1172, and 1181, button 508, conductors 1182 and 1183, winding 486 of attack angle engage relay 485, attack angle disengage button 498, and ground connection 1184.

Relay 485 operates, completing a holding circuit which may be traced from positive bus 473 through contacts 577 and 576 of elevator engage relay 573, conductors 1162 and 1165, contacts 585 and 584 of reset relay 131, conductors 1166, 1185, and 1186, contacts 501 and 496 of attack angle engage relay 450, conductor 1183, winding 486, disengage button 498, and ground connection 1184. Button 508 may now be released without causing relay 485 to be deenergized: this can be caused if desired, however, by momentary operation of button 498.

It is obvious that operation of relay 485 cannot be initiated if elevator engage relay 573 is not energized, or if reset relay 131, anti-engage relay 505 or turn control relay 642 is energized, or if function selector 442 is in its glide position. On the other hand, once the holding circuit is established operation of function selector 442, turn control relay 642, or anti-engage relay 505 cannot deenergize relay 450, although operation of elevator engage relay 573 or reset relay 131 still can do so.

Operation or relay 485 also interrupts flashing energization of lamp 499 at contacts 495 and 492, and establishes continuous operation of the lamp through a circuit which may be traced from positive bus 473 through contacts 577 and 576 of elevator engage relay 573, conductors 1162 and 1165, contacts 585 and 584 of reset relay 131, conductors 1166, 1185, and 1187, contacts 500 and 492, conductor 1175, lamp 499, and ground connection 1176. Lamp 499 now operates continuously.

Operation of attack angle engage relay 485 also completes a circuit which may be traced in Figure 6 from inverter terminal 831 through conductor 973, contacts 502 and 497 of relay 485, conductor 1188, conductor 977 (Figure 4) and quadrature capacitor 408 to the line phase winding of reset motor 395. It will be recalled that the amplifier phase winding of this motor is already energized, by engagement of reset relay contacts 390 and 391, in accordance with departure of the attack angle of the craft from a selected value, as measured by displacement between sliders 432 and 433. Both windings of the reset motor are now energized, and the motor drives power control lever 180 in accordance with this attack angle deviation, adjusting the R. P. M. and throttle levers to give power suitable to maintain flight at a scheduled attack angle regardless of changes in the loading of the craft, relative wind, and so on.

To accomplish this slider 433 must be fixed in position. This is done by operation of attack angle engage relay 485, whose armature 487 extends as shown in Figures 6 and 5 to move contacts 490 and 491 out of engagement with contacts 493 and 494, and hence to prevent any operation of motor 114 from amplifier 117. Relay 485 also interrupts the input to amplifier 117, as shown in Figure 4, by moving contact 464 out of engagement with contact 465. The selected attack angle, that is, the attack angle prevailing when attack angle engage button 508 was operated, is accordingly maintained constant, and any change in the actual attack angle, which moves slider 414, thus impresses a voltage through summing resistor 394 (Figure 4) on the input to amplifier 80. Reset motor 395 operates to adjust the MAP and R. P. M. selectors, changing the power of the engine until the attack angle is again that selected.

Selecting a new attack angle

A craft initially in level flight and subsequently placed under attack angle control as described above continues in level flight at the same air speed. While advantageous for medium intervals, this has an undesirable effect for very long flights, where the change in load due to fuel consumption is large. As the weight of the craft decreases the required lift also decreases, so that the attack angle system decreases the power supplied by the engine. If the flight length is sufficient, this may result in engine adjustments considerably displaced from those for most efficient engine operation. Over-all efficiency requires that both the wing and the engine operate at their most efficient condition.

Attack angle selector 123 is provided in this apparatus so that the human pilot may adjust the selected attack angle during the course of the flight. Used in conjunction with pitch attitude selecting means, as shown in my copending application referred to above, the attack angle selector makes it possible to modify the flight condition of the craft, so that maximum over-all efficiency again prevails.

Attack angle selector 123 (Figure 5) is made operative by manual displacement of knob 509. If this knob is displaced upwardly a slight amount, a circuit is completed which may be traced from positive bus 473 through conductor 1191, movable contact 512, resilient contact 516, conductor 1192, resistor 518, conductors 1193, 1040, and 1130, motor 114, conductors 1031 and 1032, resistor 504, conductor 1033, coil 506 of relay 505, (Figure 6) and ground connection 1034. Motor 114 now operates, adjusting slider 433 (Figure 4) out of alignment with slider 432, so that a voltage appears across winding 420 of voltage divider 400, and is impressed by conductor 1065 and resistors 254 and 260 (Figure 2) on amplifiers 141 and 140, thus causing adjustment of the throttles to bring the craft to the new attack angle. The voltage across winding 420 (Figure 4) also is impressed upon amplifier 80, and reset motor 393 operates to adjust power selector 180, also changing the power of the craft.

If knob 509 (Figure 5) is operated all the way in the upward direction, the circuit from movable contact 512 to conductor 1040 is completed through resilient contact 516, fixed contact 514, and conductor 1195, thus short circuiting resistor 518 and applying full voltage to motor 114.

If knob 509 is pushed downward, a circuit is completed from positive bus 473 through conductor 1191, movable contact 512, resilient contact 515, conductor 1196, resistor 517, conductors 1197, 1200, 1032, and 1031, motor 114, conductors 1030 and 1040, resistor 503, conductor 1033, coil 506 of relay 505 (Figure 6), to ground connection 1034. Motor 114 operates in the opposite direction, oppositely displacing slider 433 from slider 432 and causing operation of the throttle motor and reset motor in the opposite sense to that just described.

If knob 509 is operated all the way in the downward direction, the circuit from switching contact 512 to conductor 1200 is completed through resilient contact 515, fixed contact 513, and conductor 1202, thus short circuiting resistor 517 and applying full voltage to motor 114.

The human pilot may of course operate attack angle selector 123 without concurrently changing the pitch attitude of the craft. If, for example, the apparatus is set up for level flight and the concomitant horizontal relative wind, the only way the attack angle can be decreased is by giving the craft's motion a vertically upward component, which can be done, at the lift to drag ratio determined by its pitch attitude, if the air speed is increased. This requires greater engine power to overcome the increased drag which accompanies the increased lift to drag ratio. Accordingly an increase in selected attack angle results in gliding flight at a reduced air speed, and a decrease in selected attack angle results in climbing flight at an increased air speed.

*Mixture warning*

The latter effect introduces another complication. In cruising flight the human pilot sets his mixture control at "automatic lean" and leaves it there. For normal ranges of power this is perfectly satisfactory. As the throttles and R. P. M. levers are advanced more and more power is demanded from the engine, and its temperature accordingly rises. There comes a time when the engine temperature approaches a dangerous value, and further power can be obtained only if additional means can be found to cool the engine. The human pilot can accomplish this cooling function by making the mixture richer, and he normally does so when the craft is being flown manually. When the power is being controlled automatically, however, and the human pilot simply operates attack angle selector 123, it is possible that the necessity of the mixture setting change may not occur to him.

To care for this contingency lamp 519 is shown in Figure 5 to be energized from positive bus 473 through conductor 1203, switch 520, and conductor 1204, the circuit being completed through ground connection 1205. Switch 520 is normally open, and is closed through mechanical connection 199 by cam 198 (Figure 2) when power control lever 180 is advanced to more than 60 percent of its total range of travel. Thus whether the lever be operated manually or automatically, a signal is given to the human pilot that the demands on the engine are such as to make richer mixture necessary or at least desirable.

*MAP limit apparatus*

The purpose of amplifier 183 and relay 54 will now be appreciated. It will be recalled that upon the appearance of a discrepancy between the actual and selected values of attack angle, a signal is supplied through summing resistor 394 (Figure 4) to reset amplifier 80, and through conductor 1065 and summing resistors 254 and 260 (Figure 2) to throttle amplifiers 140 and 141. By reason of the latter connection the throttles are adjusted, and by reason of the former connection the throttles and engine governors are adjusted simultaneously.

Throttle motors 271 and 290 are relatively quick acting, while reset motor 395 is relatively slow acting: consequently any discrepancy in attack angle is corrected for rapidly by the throttle motors and much more slowly by the reset motor.

For each value of R. P. M. of an aircraft engine there is a maximum value of MAP which may not be exceeded without danger to the engine. The apparatus here described operates near the limit of MAP for each value of R. P. M. to get maximum efficiency. Suppose now that the human pilot operates attack angle selector 123 so as to call for a sudden large decrease in attack angle. This results in a sudden large demand for power from the engines: the direct signal through summing resistors 254 and 260 at once begins to advance the throttles much more rapidly then the R. P. M. levers are advanced by the reset motor, and the MAP rapidly approaches the danger point.

When dangerous values of MAP are developing, the voltages on sliders 154 and 162 of Figure 2 approach or exceed that on slider 191 which is operated through shaft 86 by motor 395 or manual lever 180. The input to amplifier 183 is reduced to zero, and relay 54 is deenergized. Further operation of the throttle motors is thus prevented until the MAP is reduced to a safe value by increase in the R. P. M. resulting from operation of reset motor 395, which is not interrupted. The human pilot is thus prevented from causing a dangerous condition of flight: at the same time the MAP limit is varied to maintain it as high as possible for various power lever settings.

*Manual ratio adjustment*

A further refinement of the apparatus as a whole is found in voltage divider 300 of Figure 3. Suppose the craft is in level flight at a selected attack angle and pitch attitude: then amplifiers 80, 140, 141, 300, and 301 have no input voltages and motors 395, 271, 291, 384, and 387 are not in operation. Throttles 20 and 40 and R. P. M. levers 58 and 71 are in particular positions. Now if slider 322 of voltage divider 310 is displaced from its position to some other position, inputs are supplied to amplifiers 300 and 301, and the R. P. M. levers are adjusted by operation of motors 384 and 387 sufficient to reduce the amplifier inputs to zero by supplying offsetting voltages on sliders 315 and 324. This change in R. P. M. is accompanied by a change in attack angle, which is sensed by vane 94 and normal responsive operation of the apparatus as a whole results, a stable condition being reached in which both throttles and R. P. M. levers are in new positions, but in which the attack angle remains as before. The human pilot thus has available manual means for varying, within limits, the relative amount of throttle control and R. P. M. control prevailing to give flight at a particular attack angle.

Turn control knob 639 is provided for use by the human pilot when it is desired to permanently change the heading of the craft, as shown in my copending application previously referred to. Transient conditions of flight prevail, however, whenever this knob is turned, and it is undesirable to engage the automatic pilot, the power stabilizing apparatus, or the attack angle apparatus while such transient conditions prevail. Such unwanted engagement is prevented by turn control relay 642, which is energized whenever knob 639 is displaced even slightly in either direction from its central position, so that movable contact 649 engages fixed contact 658 or fixed contact 659. The shaft 638 of the turn control knob is continued and performs its customary function in the automatic pilot, causing turn of the craft in one direction or the other at an increased rate as the knob is displaced further and further from its central position in either direction. The circuit energizing relay 642 may be traced from positive bus 473 through conductors 807 and 1206, movable contact 649, fixed contact 658 or fixed contact 659, conductor 1207, and winding 643 of relay 642, the circuit being completed through ground connection 1210.

Operation of relay 642 interrupts, at contacts 645 and 647, the circuit from positive bus 473 to master engage button 572, and incidentally that for energizing lamp 605 through flasher relay contacts 593 and 595. Operation of relay 642 also interrupts, at contacts 646 and 648, the circuit from positive bus 473 through elevator engage relay 573, reset relay 131, and anti-engage relay 505 to attack angle engage button 508, and incidentally that for energizing lamp 499 through flasher relay contacts 594 and 596. Both engage buttons are thus disabled when turn control knob 639 is operated, although with the apparatus engaged, operation of turn control knob 639 is ineffective to cause disengagement because of the independent holding circuits set up by engagement of the apparatus.

Operation of the attack angle disengage button 498 has been described as deenergizing the attack angle apparatus and causing lamp 499 to flash instead of continuously operating. If both power disengage buttons are operated, reset relay 131 is operated, the initiating and holding circuits for the attack angle control apparatus are both interrupted at contacts 534 and 585, and lamp 499 is extinguished. Operation of elevator disengage button 580 causes interruption of the same circuit at contacts 577 and 576.

It is obvious that master and submaster disengage buttons can be provided if desired.

*Constant altitude operation*

It is now necessary to consider in more detail the function of voltage divider 409 and related structure in Figure 4. It will be recalled that slider 432 of voltage divider 430 is positioned in accordance with the position of vane 94, and that slider 433 is set by motor 114 to a selected value of attack angle, relay 485 deenergizing amplifier 117 to maintain the selected value constant. By general acceptance in the field, the attack angles represented by the positions of sliders 432 and 433 are measured from a zero which coincides with the longitudinal axis of the craft. This is not the same direction as the direction of zero lift, in practically all aircraft, because of the angle between the chord of the wing and the longitudinal axis of the craft.

The loss of lift occuring when a craft changes from a wing level attitude to a banked attitude is a function of the attack angle, measured from the angle of zero lift, and of the cosine of the bank angle. This loss is to be compensated for according to the present invention, by an increase in the attack angle error signal, which, as has previously been pointed out appears between ground connection 982 and input conductor 983 of amplifier 80, the latter conductor being connected through a previously traced circuit to slider 433. When slider 419 is at the top end of winding 429, slider 432 is directly grounded and the error signal is the voltage between sliders 432 and 433, as previously stated. If slider 419 is displaced from the upper end of winding 429, by reason of roll of the craft, there is added to this error voltage a portion of the voltage impressed across winding 429, the portion depending on the amount of displacement and the characterization of the winding.

The lower end of winding 429 is connected by conductor 957 to slider 416 of voltage divider 406, whose winding 426 is energized from secondary winding 454 of transformer 451 through conductors 948 and 949. Conductors 949 and 954 are connected by conductor 1239.

Slider 416 is manually set in accordance with the angular displacement between the direction of the longitudinal axis of the craft—the zero of attack angle on indicator 110—and the direction of zero lift. The voltage on slider 433 with respect to slider 416 is then proportional to the selected attack angle measured with respect to the angle of zero lift. As slider 419 is downwardly displaced a smaller and smaller portion of the former voltage is opposed to the latter voltage, so that the former voltage must be increased, by upward movement of slider 433. In other words, as the craft banks, a larger attack angle is required to reduce the input to the reset amplifier to zero, and until this voltage is zero the reset motor continues to operate to adjust the R. P. M. and MAP selectors to increase the attack angle.

Satisfactory operation of this component of the invention requires that the winding 429 of voltage divider 409 be characterized so that as the slider moves downward in proportion to the bank angle $\phi$ of the craft, the change in voltage between slider 432 and ground is proportional to $1/\cos \phi$. This is because the loss of vertical lift component resulting from banking of the craft is proportional to the cosine of the bank angle, and the correction must increase the selected attack angle to the same extent.

*Instrument landings*

The discussion thus far has assumed the craft to be cruising, so that maximum over-all efficiency is desired. This is not the case when the craft is approaching its destination and the features of the apparatus particularly related to operation of the craft prior to landing will now be described. The description in this application will omit detail as far as the azimuth control of the craft is concerned, since this forms the subject matter of my copending application referred to above.

Function selector 442 (Figure 4) has for its primary purpose to control the operation of the glide path coupler 125 and an associated localizer coupler, which convert signals from the ILS receiver 17 into a form suitable for the power control apparatus and the automatic pilot. It permits the human pilot to cause the craft to follow the localizer beam either toward the transmitter (inbound) or away from the transmitter (outbound).

When function selector 442 is in its outbound position, a circuit is completed from positive bus 473 through conductor 1211 (Figure 5), movable contact 523, fixed contact 524, conductor 1212, the winding of a reverse relay 1213, and ground connection 1214. Relay 1213 is a portion of the localizer coupler unit, and is suggested in Figure 5 only for completeness. The circuit for master engage button 572 and for contacts 593 and 595 of flasher relay 590 is interrupted when movable contact 530 (Figure 6) of function selector 442 moves out of engagement with fixed contact 532. Movable contacts 443 and 535 complete the circuit from conductors 1076 and 1170 to conductors 1080 and 1172 through fixed contacts 444 and 536 instead of through fixed contacts 445 and 537.

While function selector 442 is in its off position, the efficiency approach switch 404 of Figure 5 may be closed manually by the human pilot to complete a circuit which may be traced from positive bus 473 through conductor 1215, switch 504, winding 236 of relay 137, and ground connection 1217. This is also true in the outbound and inbound positions of function selector 442.

The armature 237 of relay 137 performs functions in Figures 2 and 3. In Figure 2 movable contacts 240 and 243 of the relay are moved out of normal engagement with fixed contacts 241 and 244, and into engagement with fixed contacts 242 and 245 which are connected to sliders 157 and 190 respectively. Sliders 157 and 190 are positioned simultaneously with sliders 160 and 191 by operation of mechanical connection 86. The voltage on slider 157 is substituted for the voltage on slider 160 in the input to amplifiers 140 and 141, and the voltage on slider 190 is substituted for that on slider 191 in the input to amplifier 183. Throttle motors 271 and 290 now operate until the amplifier input voltages are again zero, and relay 54 now drops out at a new limiting value of MAP.

In Figure 3 movable contact 354 of relay 137 is moved out of normal engagement with fixed contact 355 and into engagement with fixed contact 356, which is connected to slider 320. Slider 320 is positioned simultaneously with slider 321 by operation of mechanical connection 86. The voltage on slider 320 is substituted for the voltage on slider 321 in the input to amplifiers 300 and 301. R. P. M. motors 384 and 387 now operate until the amplifier input voltages are again zero. If operation of the throttle and R. P. M. motors causes the attack angle of the craft to change, this is sensed by vane 94, and changes in the amplifier inputs independent of operation of relay 137 result. Eventually the apparatus reaches a new equilibrium where the desired attack angle is attained by a different set of adjustments for throttle and R. P. M. levers, which gives less efficient but safer operation of the craft.

The operation of the apparatus in the inbound position of function selector 442 is the same as in its outbound position, except that movable contact 523 does not complete the circuit to relay 1213.

When the craft has come on to the glide path beam, the human pilot advances function selector 442 into its glide position. The mechanical connection to switch 504 is such that the switch is automatically moved into its closed position if not already in that position, and is locked there so that it cannot be opened manually as long as function selector 442 is in its glide position.

Movable contact 535 of the function selector engages fixed contact 541, thus opening the energizing circuit for attack angle engage button 508 and for flashing operation of lamp 449. Movable contact 530 of the function selector is still out of engagement with fixed contact 532, thus opening the energizing circuit from master engage button 572 and for flashing operation of lamp 605.

Movable contact 523 energizes fixed contact 527, and a circuit may be traced from positive bus 473 through conductor 1211, movable contact 523, fixed contact 527, conductors 1220, 1221, and 1222, movable contact 545 and fixed contact 547 of go-around relay 136, and the winding 556 of a glide path relay 557, the circuit being completed through ground connection 1224. Relay 557 is thus energized, and performs its usual function in the glide path coupler 125, namely that of completing a circuit so that there appears at output conductors 1231 and 1232 (Figure 4) an alternating voltage of the same frequency as inverter 470, of amplitude determined by the amount of departure of the craft from the glide path, and in phase or 180° out of phase with the inverter voltage, depending on the sense of the departure of the craft from the glide path.

Still referring to Figure 4, movable contact 443 of function selector 441 is now in engagement with fixed contact 447, and the circuit from conductor 1076 to conductor 1021 now includes movable contact 443, fixed contact 447, conductor 1231, coupler 125, conductor 1232, slider 417, the portion of winding 427 above the slider and conductor 1233. The voltage supplied on conductor 1065 to throttle amplifiers 140 and 141, and on conductor 983 to reset amplifier 80, now includes a component determined by the position of slider 417, and a component determined by the output of coupler 125.

Slider 417 is manually set in accordance with the actual slope of the glide path at the destination, normally 2½ degrees, so that the attack angle control apparatus now corrects the attack angle for flight at an attack angle 2½ degrees greater than before. This, as previously pointed out, converts level flight to gliding flight at an angle of 2½ degrees, and the same measured attack angle. If the craft departs from the beam, a signal is supplied by coupler 125 and impressed on the throttle and reset amplifiers in simulation of a departure of the attack angle from the selected value, and the craft proceeds down the beam.

*Go-around operation*

In the last few seconds of an approach the human pilot has many things to do and to watch, and automatic control of the craft is a great convenience. However, especially in landings on aircraft carriers, it sometimes happens that the approach must be broken off almost at the very end. This is referred to as a "wave-off," and the craft is required to "go-around" and try a second approach. The first attempt is made under practically stalling conditions, and if there is a wave-off the human pilot must be able to regain manual control of the craft instantly and without having to remove his attention from the actual work of getting the craft safely airborne again at a satisfactory altitude.

To facilitate this, go-around button 560 and go-around relay 136 are provided. When the wave-off is given, the human pilot need only press button 560 momentarily: the result is that manual control of the attitude of the craft is restored, and an arbitrary set of throttle and R. P. M. adjustments for maximum safe power is automatically established. The operation of the automatic pilot under go-around conditions is claimed in my copending application referred to above. The power control operation is shown in Figures 2, 3, 5, and 6 herein.

In Figure 5, operation of go-around button 560 completes a circuit which may be traced from positive bus 473 through conductor 1211, movable contact 523, fixed contact 527, conductors 1220 and 1234, button 560, conductor 1235 and winding 226 of go-around relay 136, the circuit being completed through ground connection 1236. Relay 136 operates, completing a holding circuit from positive bus 473 through conductor 1211, movable contact 523, fixed contact 527, conductors 1220, 1221, and 1237, movable contact 551, fixed contact 554, conductor 1240, winding 226, and ground connection 1236. Button 560 may now be released without causing relay 557 to become energized: this latter effect can now be accomplished only by moving function selector 442 out of its glide position, which displaces movable contact 523 out of engagement with fixed contact 527.

Operation of relay 136 interrupts, at contacts 545 and 547, the circuit energizing winding 556 of glide path relay 557, thus interrupting the output from coupler 125, and simultaneously completes a circuit which may be traced from positive bus 473 through conductor 1211, movable contact 523, fixed contact 527, conductors 1220, 1221, and 1222, movable contact 545, fixed contact 552, conductors 1241 and 825 (Figure 6) winding 582 of reset relay 131, and ground connection 826. Reset relay 131 operates, as has been explained, to interrupt at contacts 584 and 585 the initiating and holding circuits for attack angle engage relay 485, completing at contacts 586 and 587 the line phase energization of the reset motor, and substituting for the attack angle error, as an input to amplifier 80, the signal on conductor 383 of Figure 4, so that motor 395 runs. None of the sliders operated by motor 395 through shaft 86 is effective on the input to reset amplifier 80, so that the motor runs until the engine governor positions, under the control of the R. P. M. motors, come to a selected value determined as will now be described, referring to Figure 3.

Operation of relay 136 acts through armature 227 to displace movable contact 351, Figure 3, out of normal engagement with fixed contact 352 and into engagement with fixed contact 353, which is connected to slider 317. The voltage on slider 317 is therefore substituted for the voltage on slider 320 in the input to amplifiers 300 and 301. Slider 317 is not operated by shaft 86, so that the voltage supplied to amplifiers 300 and 301 is independent of power selector 180. Motors 384 and 387 run until the amplifier inputs become zero by adjustment of governor position sliders 315 and 324. The effect of differential R. P. M. sliders 316 and 323 is opposite on the two amplifiers, so that the two engine governors may be in different positions, but the reset amplifier is affected in accordance with the positions of both governors, so no complications result.

Motors 384 and 387 run until their amplifier inputs are zero, as just described, and reset motor 393 runs until the mean governor position is that selected by slider 317.

Referring now to Figure 2, it will be seen that operation of relay 136 displaces movable contacts 230 and 233 out of normal engagement with fixed contacts 231 and 234 and into engagement with fixed contacts 232 and 235 which are connected to sliders 156 and 187 respectively. The voltage on slider 156 is therefore substituted for the voltage on slider 157 in the inputs to amplifiers 140 and 141, and the voltage on slider 187 is substituted for the voltage on slider 190 in the input to amplifier 183. Sliders 156 and 187 are not operated by shaft 86, so that the voltages applied to amplifiers 140, 141, and 183 from these sliders are independent of power selector 192. Motors 271 and 290 run until the inputs to amplifiers 140 and 141 become zero, by adjustment of sliders 155 and 161. Thereafter any adjustment of shaft 86 by reset motor 393 has no effect in the throttle control system.

When the go-around condition prevails, the R. P. M., MAP, and MAP limit are all set at preselected values not connected in any way with power selector 180, and the pilot need give no attention to the engines, so that his full efforts can be directed to flying the craft into a safe position. When this is achieved, he may reestablish normal control flight moving function selector 442 out of its glide position, which deenergizes the go-around relay circuit at contacts 523 and 527, and permits reopening of efficiency approach switch 504 if this is desired.

Résumé

A review of this application makes it apparent that the present invention is directed to attack angle control apparatus which functions, in combination with suitable pitch attitude stabilizing apparatus, to cause a craft to continue in flight at a selected attack angle, by adjustment of the throttle and R. P. M. levers of the craft's engines. The apparatus includes power stabilizing apparatus having a manual power control lever which may be used to control servomotors operating the engine control levers in either of two different ratios, and this manual power control lever is servo actuated when the apparatus is fully in operation to control the power in accordance with deviation of the craft's attack angle from a desired value. The apparatus also includes an attack angle responsive vane and an indicator of actual and selected attack angle, and an attack angle selector for changing the selected attack angle whether or not the apparatus as a whole is in use, and means are also included for keeping the selected attack angle the same as actual attack angle when the system is not in full operation.

Detailed contributions of the invention include differential R. P. M. control, MAP limit control, interlocking arrangements for preventing initiation of either power stabilization or attack angle control when it would be unsafe to do so, altitude compensation in the MAP control portion of the apparatus, automatic selection of the safer of two MAP-to-R. P. M. ratios when the craft is making automatic landings, and automatic mixture warning.

Numerous objects and advantages of my invention have been set forth in the foregoing description, together with details of the structure and function of the invention, and the novel features thereof are pointed out in the appended claims. The disclosure, however, is illustrative only, and I may make changes in detail within the principle of the invention to the full extent indicated by the broad general meaning of the terms in which the appended claims are expressed.

I claim as my invention:

1. Attack angle control apparatus, for aircraft having a plurality of engines, comprising, in combination: servomotor means for adjusting the manifold pressure of one of the engines; follow-up means giving an output varying with operation of said servomotor means; responsive means for giving an output proportional to the actual manifold pressure of said engine; selecting means giving an output proportional to a selected value of manifold pressure means connected to said servomotor means, said follow-up means, said responsive means, and said selecting means for controlling said servomotor means in proportion to the sum of said outputs; means energizable to disable said controlling means; means supplying a further output in accordance with the relation between said selected value of manifold pressure and the average of the manifold pressures of the engines; and means interconnecting said two last named means so that said controlling means is disabled when said average exceeds said selected value.

2. Attack angle control apparatus, for aircraft having a plurality of engines, comprising, in combination: servomotor means for adjusting the manifold pressure of one engine; follow-up means giving an output varying with operation of said servomotor means; selecting means giving a further output varying in accordance with a selected value of manifold pressure; means connected to said servomotor means, said follow-up means, and said select-ing means for controlling said servomotor means in accordance with said outputs; means energizable to disable said controlling means; means supplying a further output in accordance with the relation between said selected value of manifold pressure and the average of the manifold pressures of the engines; and means interconnecting said two last named means so that said control means is disabled when said average exceeds said selected value.

3. Attack angle control apparatus, for aircraft having a plurality of engines, comprising, in combination: servomotor means for adjusting the manifold pressure of one engine; responsive means for giving an output varying with the manifold pressure of the engine; selecting means giving a further output varying in accordance with a selected value of manifold pressure; means connected to said servomotor means, said responsive means, and said selecting means for controlling said servomotor means in accordance with said outputs; means energizable to disable said controlling means; means supplying a further output in accordance with the relation between said selected value of manifold pressure and the average of the manifold pressures of the engines; and means interconnecting said two last named means so that said controlling means is disabled when said average exceeds said selected value.

4. Attack angle control apparatus, for aircraft having at least one engine, comprising, in combination: control means operable through a range of positions extending on both sides of a predetermined position to adjust the manifold pressure of the engine through a range of values extending above and below a predetermined value corresponding to said predetermined position of said control means; follow-up means adjustable through a range of positions extending on both sides of a predetermined position to give a non-uniform first output having a large gradient on one side of said predetermined position, and a small gradient on the other side of said predetermined position; servomotor means connected to adjust said control means and said follow-up means so that their respective displacements from their predetermined positions are always in the same proportion, and so that said first output is in the large gradient range when the manifold pressure is less than said predetermined value; manifold pressure responsive means giving a non-uniform second output having a small gradient for manifold pressures less than said predetermined value and a large gradient for manifold pressures greater than said predetermined value; selecting means supplying a third output which may be varied in accordance with a selected value of manifold pressure; and means connected to said servomotor means, said follow-up means, said responsive means, and said selecting means for controlling said servomotor means in accordance with said first, second, and third outputs.

5. Attack angle control apparatus, for aircraft having at least one engine, comprising, in combination: servomotor means for causing change, within a range of values, in a parameter of operation of the engine; selecting means giving a signal in accordance with a desired value of said parameter; follow-up means connected to said servomotor means for giving a signal which varies non-uniformly with operation of said servomotor means and is greatest for positions thereof resulting in values of said parameter near the lower end of said range; responsive means giving a signal which varies non-uniformly with the actual value of said parameter and is greatest for values of said parameter near the upper end of said range; and means controlling said servomotor means in accordance with said signals, so that when the said parameter is near the lower end of said range the apparatus operates as a proportioning system, while as the value of said condition increases the apparatus is smoothly transformed into a floating system, without any abrupt transition.

6. Attack angle control apparatus, for aircraft having a plurality of engines, comprising, in combination: servomotor means for adjusting a characteristic of the operation of at least one of the engines; follow-up means giving an output varying with operation of said servomotor means; differential means for giving an output responsive to the relation between the value of said characteristic of said one engine and the value of said characteristic of another engine; first and second selector means adjustable to give outputs varying differently for identical adjustments thereof; means simultaneously adjusting said selecmeans in accordance with a selected value of said characteristic; and means connected to said servomotor means, said follow-up means, said differential means, and both said selector means for controlling said servomotor means selectively in accordance with said two first named outputs and with the output of either of said selector means.

7. Attack angle control apparatus, for aircraft having a plurality of engines, comprising, in combination: servomotor means for adjusting the speed of at least one of the engines; follow-up means giving an output varying with operation of said servomotor means; differential means for giving an output responsive to the relation between the speed of said one engine and the speed of another engine; first and second selector means adjustable to give outputs varying differently for identical adjustments thereof; means simultaneously adjusting said selector means in accordance with a selected engine speed; and means connected to said servomotor means, said follow-up means, said differential means, and both said selector means for controlling said servomotor means selectively in accordance with said two first named outputs and with the output of either of said selector means.

8. Attack angle control apparatus, for aircraft having at least one engine, comprising, in combination: engine governor control means for adjusting the speed of the engine in accordance with a selected value; throttle control means for adjusting the manifold pressure of the engine in accordance with a selected value; a plurality of sets of adjustable selectors, each set including an engine speed selector and a manifold pressure selector, the several engine speed selectors and the several manifold pressure selectors having different engine speed and manifold pressure selecting characteristics for the same range of adjustment; power control means connected to all said selectors for simultaneously adjusting all said selectors through said range; and means connected to said governor and throttle control means and to all said selectors for selectively connecting any one of said sets of selectors in controlling relation to said governor and throttle control means so as to determine the ratio of engine speed control to manifold pressure control resulting from a given adjustment of said power control means.

9. Attack angle control apparatus according to claim 8 including manual means connected to said engine speed adjusting means for modifying the operation thereof independently of said power control means, to vary said ratio within a limited range.

10. Attack angle control apparatus, for aircraft having a pair of engines, comprising, in combination: engine governor control means for adjusting the speed of each engine in accordance with a selected value; means for modifying the operation of said engine governor control means, in accordance with any difference between the speeds of the engines, so as to cause them to run at the same speed; throttle control means for adjusting the manifold pressure of each engine in accordance with a selected value; a plurality of sets of adjustable selectors; each set including an engine speed selector and a manifold pressure selector, the several engine speed selectors and the several manifold pressure selectors having different engine speed and manifold pressure selecting characteristics for the same range of adjustment; power control means connected to all said selectors for simultaneously adjusting all said selectors through said range; and means connected to all said selectors and to said governor and throttle control means for selectively connecting any one of said sets of selectors in controlling relation to said governor and throttle control means so as to determine the ratio of engine speed control to manifold pressure control for each engine resulting from a given adjustment of said power control means.

11. Attack angle control apparatus, for aircraft having a pair of engines, comprising, in combination: selecting means giving an output varying in accordance with a selected manifold pressure; responsive means for giving outputs varying with the manifold pressures of the engines; means for performing a control function; and means connected to said last named means, said selecting means, and said responsive means for causing operation of the last named means when the last named outputs jointly exceed the first named output by more than a predetermined amount.

12. Attack angle control apparatus, for aircraft having a pair of engines, comprising, in combination: selecting means giving an output varying in accordance with a selected manifold pressure; responsive means for giving an output varying with the manifold pressure of each of the engines; reversible means for adjusting the manifold pressures of said engines in either of two directions; and means connected to said last named means, said selecting means, and said responsive means for preventing operation of said last named means, in one direction, when said last named outputs jointly exceed said first named output by more than a predetermined amount.

13. Attack angle control apparatus, for aircraft having at least one engine, comprising, in combination: engine governor control apparatus for adjusting the speed of the engine in accordance with a selected value; throttle control means for adjusting the manifold pressure of the engine in accordance with a selected value; manifold pressure limiting means connected to said throttle control means for disabling the same whenever the manifold pressure of the engine exceeds a limiting value; a plurality of sets of selectors, each set including an engine speed selector, a manifold pressure selector, and a pressure limit selector, the several engine speed selectors, the several manifold pressure selectors, and the several pressure limit selectors having different engine speed and manifold pressure selecting characteristics for the same range of adjustment; power control means connected to all said selectors and arranged for simultaneously adjusting all said selectors through said range; and means connected to all said selectors, to said governor and throttle control means, and to said limiting means for selectively connecting any one of said sets of selectors in controlling relation to said throttle control means and said limiting means, so as to determine the ratio of engine speed control to manifold pressure control, and the limiting value of manifold pressure, resulting from a given adjustment of said power control means.

14. Attack angle control apparatus, for aircraft having at least one engine, comprising, in combination: throttle control means for adjusting the manifold pressure of the engine in accordance with a selected value; manifold pressure limiting means connected to said throttle control means for disabling the same whenever the manifold pressure of the engine exceeds a limiting value; a plurality of sets of selectors, each set including a manifold pressure selector and a pressure limit selector, the several manifold pressure selectors and the several pressure limit selectors having different engine speed and manifold pressure selecting characteristics for the same range of adjustment; power control means connected to all said selectors for simultaneously adjusting all said selectors through said range; and means connected to all said selectors, to said throttle control means, and to said limiting means for selectively connecting any one of said sets of selectors in controlling relation to said throttle control means and said limiting means, so as to determine the amount of manifold pressure control and the limiting value of manifold pressure resulting from a given adjustment of said power control means.

15. Attack angle control apparatus, for an aircraft having at least one engine, comprising, in combination: engine governor control means for adjusting the speed of the engine in accordance with a selected value; manifold pressure limiting means for performing a control function whenever the manifold pressure of the engine exceeds a limiting value; a plurality of sets of selectors, each set including an engine speed selector and a pressure limit selector, the several engine speed selectors and the several pressure limit selectors having different engine speed and manifold pressure selecting characteristics for the same range of adjustment; power control means connected to all said selectors for simultaneously adjusting all said selectors through said range; and means connected to all said selectors, to said governor control means, and to said limiting means for selectively connecting any one of said sets of selectors in controlling relation to said governor control means and said limiting means, so as to determine the amount of engine speed control, and the limiting value of manifold pressure, resulting from a given adjustment of said power control means.

16. Attack angle control apparatus, for aircraft having at least one engine, comprising, in combination: engine governor control means for adjusting the speed of the engine of the craft in accordance with a selected value; throttle control means for adjusting the manifold pressure of the engine in accordance with a selected value; manifold pressure limiting means connected to said throttle control means for disabling the same whenever the manifold pressure of the engine exceeds a limiting value; a plurality of selectors including an engine speed selector, a manifold pressure selector, and a pressure limit selector; power control means connected to all said selectors for simultaneously adjusting all said selectors; and means connected to all said selectors, to said governor and throttle control means, and to said limiting means for connecting all said selectors in controlling relation to said governor and throttle control means and said limiting means.

17. Attack angle control apparatus, for an aircraft having at least one engine, comprising, in combination: engine governor control means for adjusting the speed of the engine in accordance with a selected value; throttle control means for adjusting the manifold pressure of the engine in accordance with a selected value; manifold pressure limiting means connected to said throttle control means for disabling said throttle control means whenever the manifold pressure of the engine exceeds a limiting value; a plurality of sets of selectors including at least one set of normally adjustable selectors and one set of normally fixed selectors, each set including an engine speed selector, a manifold pressure selector, and a pressure limit selector, the several engine speed selectors, the several manifold pressure selectors, and the several pressure limit selectors having different engine speed and manifold pressure selecting characteristics for the same range of adjustment; power control means connected to all said selectors for simultaneously adjusting all said adjustable selectors through said range; and means connected to all said selectors and to both said control means and adjustable out of a first condition, in which said normally adjustable selectors are connected in controlling relation to said governor and throttle control means and said limiting means, so as to fix the values of engine speed, manifold pressure, and pressure limit at predetermined values, into a second condition, in which said normally adjustable selectors are connected in controlling relation to said governor and throttle control means and said limiting means, so as to determine the ratio of engine speed control to manifold pressure control, and the limiting value of manifold pressure, resulting from a given adjustment of said power control means.

18. Attack angle control apparatus, for aircraft having at least one engine, comprising, in combination: a plurality of control means for adjusting parameters of the operation of the engine in accordance with selected values of said parameters; several sets of selectors, including one set of fixed selectors and a plurality of sets of adjustable selectors, each set comprising a selector adapted for controlling each said control means; power control means connected to all said adjustable selectors for simultaneously adjusting all said adjustable selectors; first and second switching means connected to said selectors and said control means for connecting any one of said sets of selectors in controlling relation to said control means; and means connected to both said switching means for actuating said switching means in a selected sequence so that said set of fixed selectors can be so connected only after a particular one of said sets of adjustable selectors.

19. Attack angle control apparatus, for aircraft having at least one engine, comprising, in combination: a plurality of control means for adjusting parameters of the operation of the engine in accordance with selected values of said parameters; several sets of selectors including one set of fixed selectors and a plurality of sets of adjustable selectors, each set comprising a selector adapted for controlling each said control means; power control means connected to all said adjustable selectors for simultaneously adjusting all said adjustable selectors; first and second switching means each having an energized and a deenergized condition; means connecting said plurality of control means and all said sets of selectors to said switching means so that when both said switching means are deenergized one set of said adjustable selectors is in operation, when one of said switching means is energized, another set of said adjustable selectors is in operation, and when the other of said switching means is energized, said set of fixed selectors is in operation; and further means connected to both said switching means for preventing simultaneous energization of both said switching means, and for causing their energization and deenergization in a selected sequence.

20. Attack angle control means, for aircraft having a pair of engines, comprising, in combination: power selecting means; power adjusting means for each engine, individual control means connected to said power adjusting means and said power selecting means and operable to establish operation of each power adjusting means under the control of said power selecting means; an indicator; sources of continuous and intermittent energization for said indicator; switching means connected to said indicator and said sources for normally energizing said indicator from only said source of continuous energization, and operable to energize said indicator from only said source of intermittent energization; means connected to both said individual control means for simultaneous operation thereof; means connected to said control means for individually interrupting operation of said control means; and means interconnecting said control means and said switching means for causing operation of said switching means as long as either of said control means is operated.

21. Attack angle control apparatus, for aircraft having at least one engine, comprising, in combination: means for adjusting the speed of the engine; means for adjusting the manifold pressure of the engine; means responsive to deviation of the attack angle of the craft from a selected value; and means connected to both said adjusting means and to said responsive means for simultaneously controlling operation of both said adjusting means in accordance with said deviation.

22. Attack angle control apparatus, for aircraft having at least one engine, comprising, in combination: engine speed selecting means; manifold pressure selecting means; means adjusting the speed of the engine in accordance with operation of said speed selecting means; means adjusting the manifold pressure of the engine in accordance with operation of said manifold pressure selecting means; and means connected to both said selecting means for simultaneously actuating both said selecting means in accordance with deviation of the attack angle of the craft from a selected value.

23. Attack angle control apparatus according to claim 8 and means connected to the power control means for actuating the same in accordance with the deviation of the attack angle of the craft from a selected value.

24. Attack angle control apparatus, for aircraft having at least one engine, comprising, in combination: means for adjusting the speed of the engine in accordance with a selected value; means for adjusting the manifold pressure of the engine in accordance with a selected value; a plurality of sets of adjustable selectors, each set including an engine speed selector and a manifold pressure selector, the several engine speed selectors and the several manifold pressure selectors having different engine speed and manifold pressure selecting characteristics for the same range of adjustment; power control means connected to all said selectors for simultaneously adjusting all said selectors through said range; and switching means connected to all said selectors and to both said adjusting means and effective in a first position to connect the speed and manifold pressure adjusting means for control by one of said sets of selectors in which said selecting characteristics are chosen to bring about a first speed-to-pressure relationship through the range of power adjustment, and in a second position to connect said speed and manifold pressure adjusting means for control by another of said sets of selectors in which said selecting characteristics are chosen to bring about a second speed-to-pressure relationship throughout the range of power adjustment.

25. Attack angle control apparatus, for an aircraft having at least one engine, comprising, in combination: means for adjusting the speed of the engine; means for adjusting the manifold pressure of the engine; means connected to both said adjusting means for simultaneously controlling operation of both said adjusting means in accordance with deviation of the attack angle of the craft from a desired value; and means in said manifold pressure adjusting means for interrupting operation thereof in one direction only, whenever the manifold pressure of the engine exceeds a predetermined value.

26. Attack angle control apparatus according to claim 25, in which the craft has a further engine, and in which the means for interrupting operation of the manifold pressure adjusting means operates whenever the mean manifold pressure of the engines exceeds a predetermined value.

27. Attack angle control apparatus, for aircraft having at least one engine, comprising, in combination: means for adjusting the effective power of the engine; attack angle responsive means; attack angle selecting means; means connected to said adjusting means, said selecting means, and said responsive means for providing normal control of said power adjusting means in accordance with deviation of the attack angle of the craft from a selected value; and means connected to the last named means, said selecting means, and said responsive means for interrupting said normal control and actuating said selecting means into agreement with said responsive means.

28. Attack angle control apparatus, for aircraft having at least one engine, comprising, in combination: means for adjusting the speed of the engine in accordance with a selected value; means responsive to the amount of adjustment of said speed adjusting means; means for adjusting the manifold pressure of the engine in accordance with a selected value; adjustable engine speed selecting means; adjustable manifold pressure selecting means; power control means connected to both said selecting means and operable to simultaneously adjust both said selecting means; motor means connected to said power control means for actuating said power control means; and means connected to said motor means and said speed selecting means for energizing said motor means in accordance with the relation between the actual and selected values of engine speed.

29. Attack angle control apparatus, for aircraft having at least one engine, comprising, in combination: means for adjusting the power of the engine; attack angle responsive means; attack angle selecting means; motor means connected to said attack angle selecting means for adjusting the same; means connected to said responsive means, said selecting means, and said first named means for causing responsive operation of said power adjusting means in accordance with disagreement between said attack angle responsive means and said attack angle selecting means; and means connected to said last named means and to said motor means for preventing initiation of said responsive operation whenever said motor means is in operation.

30. Attack angle control apparatus, for aircraft having at least one engine, comprising, in combination: means for adjusting the power of the engine in accordance with a selected value, including fixed and adjustable power selecting means; means connected to said adjustable power selecting means for actuating the same in accordance with the attack angle of the craft; means normally connecting said adjusting means for control by said adjustable selecting means; and means for disconnecting said adjusting means from said adjustable selecting means and connecting it to said fixed selecting means.

31. Attack angle control apparatus, for aircraft having at least one engine, comprising, in combination: means for adjusting the speed of the engine; means for adjusting the manifold pressure of the engine; means connected to both said adjusting means for simultaneously controlling operation of both said adjusting means in accordance with deviation of the attack angle of the craft from a selected value; and further means connected to one of said adjusting means for independently controlling operation thereof in accordance with said deviation.

32. Attack angle control apparatus, for aircraft having at least one engine, comprising, in combination: means for adjusting the manifold pressure of the engine; means for adjusting the speed of the engine; means responsive to deviation of the attack angle of the craft from a selective value; means connected to said manifold pressure adjusting means and said responsive means for causing operation of said manifold pressure adjusting means in proportion to said deviation; and means connected to both said adjusting means and to said responsive means for independently causing operation of both said adjusting means, at a rate determined by said deviation, throughout any interval during which said deviation persists.

33. Attack angle control apparatus, for aircraft having at least one engine, comprising, in combination: engine speed selecting means; manifold pressure selecting means; means connected to said speed selecting means for adjusting the speed of the engine in accordance with operation of said speed selecting means; means connected to said pressure selecting means for adjusting the manifold pressure of the engine in accordance with operation of said manifold pressure selecting means; and means connected to both said selecting means for simultaneously actuating both said selecting means, at a rate determined by the deviation of the attack angle of the craft from a selected value, throughout any intervals during which said deviation persists.

34. Attack angle control apparatus, for aircraft having at least one engine, comprising, in combination:

engine speed selecting means; manifold pressure selecting means; means connected to said speed selecting means for adjusting the speed of the engine in accordance with operation of said speed selecting means; means connected to said pressure selecting means for adjusting the manifold pressure of the engine in accordance with operation of said manifold pressure selecting means; means connected to both said selecting means for simultaneously actuating said selecting means, at a rate determined by the deviation of the attack angle of the craft from a desired value, throughout any interval during which said deviation persists; and means connected to said manifold pressure adjusting means for independently causing operation thereof in proportion to said deviation.

35. Attack angle control apparatus, for aircraft having at least one engine, comprising, in combination: means for adjusting the power of the engine in accordance with a selected value; fixed and adjustable power selecting means; means connected to said adjustable selecting means for adjusting the same in accordance with deviation of the attack angle of the craft from a selected value; switching means connected to both said selecting means and to said adjusting means and having a normal condition, in which operation of said power adjusting means is controlled by said adjustable selecting means so as to cause the craft to proceed in level flight, and an actuated condition, in which operation of said power adjusting means is controlled by said fixed selecting means; and a function selector connected to said selecting means and said adjusting means and movable between a glide position, in which operation of said power adjusting means under the control of said adjustable selecting means is modified in accordance with vertical departure of the craft from a selected glide path and with the slope of the glide path, and an off position in which said operation remains unmodified.

36. Attack angle control apparatus as in claim 35, and means preventing the switching means from assuming said actuated condition unless said function selector is in said glide position.

37. Attack angle control apparatus, for aircraft having at least one engine, comprising, in combination: engine speed adjusting means and engine speed selecting means; means connected to said adjusting means and said selecting means for normally operating said adjusting means in accordance with operation of said selecting means; means connected to said selecting means for normally operating said selecting means in accordance with variation in the attack of the aircraft; and means connected to the last named means for interrupting the normal operation thereof and operating said selecting means to bring it into agreement with said adjusting means.

38. Attack angle control apparatus, for aircraft having at least one engine, comprising, in combination: engine speed adjusting means; manifold pressure adjusting means, means giving a signal in accordance with deviation of the attack angle of the craft from a selected value; slow acting means connected to all the above named means for causing operation of both said adjusting means as long as said signal persists; quick acting means connected to said pressure adjusting means and said signal means for causing operation of only said manifold pressure adjusting means in proportion to said deviation; quick acting means in said third named means for changing the selected attack angle, so that said first named quick acting means operates to rapidly increase the manifold pressure; and means connected to said first named quick acting means and effective whenever said manifold pressure exceeds a selected value to interrupt operation of said first named quick acting means in a sense to increase said manifold pressure, until said pressure returns below said selected value.

39. Attack angle control apparatus comprising, in combination: attack angle responsive means; attack angle selecting means; attack angle control means; means interconnecting all said means for causing operation of said attack angle control means in accordance with deviation of said attack angle from a selected value; and means connected to said attack control means for modifying the operation thereof in accordance with the reciprocal of the bank angle of the craft, to change the selected attack angle so as to maintain altitude during turns.

40. Attack angle control apparatus comprising, in combination: means supplying a control signal in response to departure of the attack angle of a craft from a selected value; means connected thereto for controlling the operation of the craft so as to reduce said control signal to zero, and responsive means connected to said first named means for modifying said control signal in accordance with a function of the bank angle, so as to maintain altitude during turns.

41. Attack angle control apparatus comprising, in combination: means normally stabilizing the attack angle of a craft measured with respect to an arbitrary direction; means giving an output in accordance with the attack angle of the craft measured from the direction of zero-lift; means giving an output in accordance with deviation of the bank angle of the craft from a selected value; and means connected to the above named means for modifying the operation of said first named means as a function of said outputs.

42. Control apparatus comprising, in combination: servomotor means for causing change, within a range of values, in a variable to be controlled; selecting means giving a signal in accordance with a selected value of the variable; follow-up means giving a signal which varies non-uniformly with operation of said servomotor means and is greatest for positions thereof resulting in values of said variable near the lower end of said range; responsive means giving a signal which varies non-uniformly with the actual value of said variable and is greatest for values of said variable near the upper end of said range; and means connected to said servomotor means, said selecting means, said follow-up means, and said responsive means for controlling said servomotor means in accordance with all said signals, the ranges of values of the signals from said follow-up means and said responsive means being so selected that when the value of said variable is near the lower end of said range the apparatus operates essentially as a proportioning system, while as the value of said variable increases the apparatus is smoothly transformed to essentially a floating system, without any abrupt transition.

References Cited in the file of this patent

UNITED STATES PATENTS

| | | |
|---|---|---|
| 2,222,947 | Harrison | Nov. 26, 1940 |
| 2,261,083 | Harrison | Oct. 28, 1941 |
| 2,273,191 | Harrison | Feb. 17, 1942 |
| 2,311,642 | Crane et al. | Feb. 23, 1942 |
| 2,390,084 | Edwards | Dec. 4, 1945 |
| 2,431,687 | Drake | Dec. 2, 1947 |
| 2,477,012 | Sorensen | July 26, 1949 |
| 2,485,431 | Chudyk | Oct. 18, 1949 |
| 2,496,294 | Kellogg | Feb. 7, 1950 |
| 2,532,936 | Peterson | Dec. 5, 1950 |
| 2,553,983 | Saxman | May 22, 1951 |
| 2,612,331 | Frazier | Sept. 30, 1952 |
| 2,620,149 | Struther | Dec. 2, 1952 |
| 2,626,767 | Bromley | Jan. 27, 1953 |
| 2,650,046 | Vanderlip | Aug. 25, 1953 |
| 2,670,157 | Peterson | Feb. 23, 1954 |